US011802935B1

(12) United States Patent
Chartier et al.

(10) Patent No.: US 11,802,935 B1
(45) Date of Patent: *Oct. 31, 2023

(54) MOBILE EMERGENCY PERIMETER SYSTEM AND METHOD

(71) Applicant: Architecture Technology Corporation, Minneapolis, MN (US)

(72) Inventors: Eric Chartier, St Louis Park, MN (US); Paul C. Davis, Saratoga, CA (US); Douglas Sweet, Sunnyvale, CA (US); Ryan L. Hagelstrom, Chaska, MN (US); Ian J. McLinden, Minneapolis, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,417

(22) Filed: Aug. 30, 2021

Related U.S. Application Data

(63) Continuation of application No. 16/709,731, filed on Dec. 10, 2019, now Pat. No. 11,105,888, which is a continuation of application No. 16/518,210, filed on Jul. 22, 2019, now Pat. No. 10,557,918, which is a
(Continued)

(51) Int. Cl.
| | |
|---|---|
| *G01S 5/06* | (2006.01) |
| *H04L 67/12* | (2022.01) |
| *H04L 67/52* | (2022.01) |
| *H04W 84/18* | (2009.01) |
| *G01S 5/00* | (2006.01) |
| *G01S 5/02* | (2010.01) |

(Continued)

(52) U.S. Cl.
CPC .............. *G01S 5/06* (2013.01); *H04L 67/12* (2013.01); *H04L 67/52* (2022.05); *G01S 5/0018* (2013.01); *G01S 5/021* (2013.01); *H04W 4/021* (2013.01); *H04W 4/40* (2018.02); *H04W 84/18* (2013.01)

(58) Field of Classification Search
CPC .......... G01S 5/06; G01S 5/0018; G01S 5/021; H04L 67/12; H04L 67/52; H04W 4/021; H04W 4/40; H04W 84/18
See application file for complete search history.

(56) References Cited

U.S. PATENT DOCUMENTS

| | | | |
|---|---|---|---|
| 8,010,079 B2* | 8/2011 | Mia .................... | H04W 76/50 |
| | | | 455/414.1 |
| 9,767,699 B1* | 9/2017 | Borghese ............. | G08G 5/0021 |
| 10,557,918 B1* | 2/2020 | Chartier ................. | H04L 67/52 |

(Continued)

*Primary Examiner* — Brandon J Miller
(74) *Attorney, Agent, or Firm* — Key IP Law Group, PLLC

(57) ABSTRACT

A method for minimizing aircraft collisions, includes detecting a flight of an unmanned aerial system (UAS) in a restricted area and determining a location of a radio frequency (RF) emitter in communication with the UAS. The method includes, at each of a plurality of RF sensors of a network of wireless RF sensors, receiving RF emissions within an RF band pertaining to UAS control, processing the received RF emissions, and transmitting data derived from the processed RF emissions. The method further includes at a designated one of the plurality of RF sensors, receiving the transmitted data from the RF sensors, a processor computing, using the transmitted data received from the RF sensors, a location estimate for the RF emitter and to predict the UAS is flying, and based on the prediction, the processor generating an alert.

19 Claims, 28 Drawing Sheets

Related U.S. Application Data continuation of application No. 15/393,181, filed on Dec. 28, 2016, now Pat. No. 10,359,501.

(51) Int. Cl.
*H04W 4/021* (2018.01)
*H04W 4/40* (2018.01)

(56) References Cited

U.S. PATENT DOCUMENTS

| | | | | |
|---|---|---|---|---|
| 2009/0075674 | A1* | 3/2009 | Qahwash | H04B 17/27 455/226.1 |
| 2013/0265198 | A1* | 10/2013 | Stroud | G01S 5/02216 342/378 |
| 2017/0273054 | A1* | 9/2017 | Beitler | H04W 64/003 |
| 2018/0014151 | A1* | 1/2018 | Kratz | H04W 4/02 |

* cited by examiner

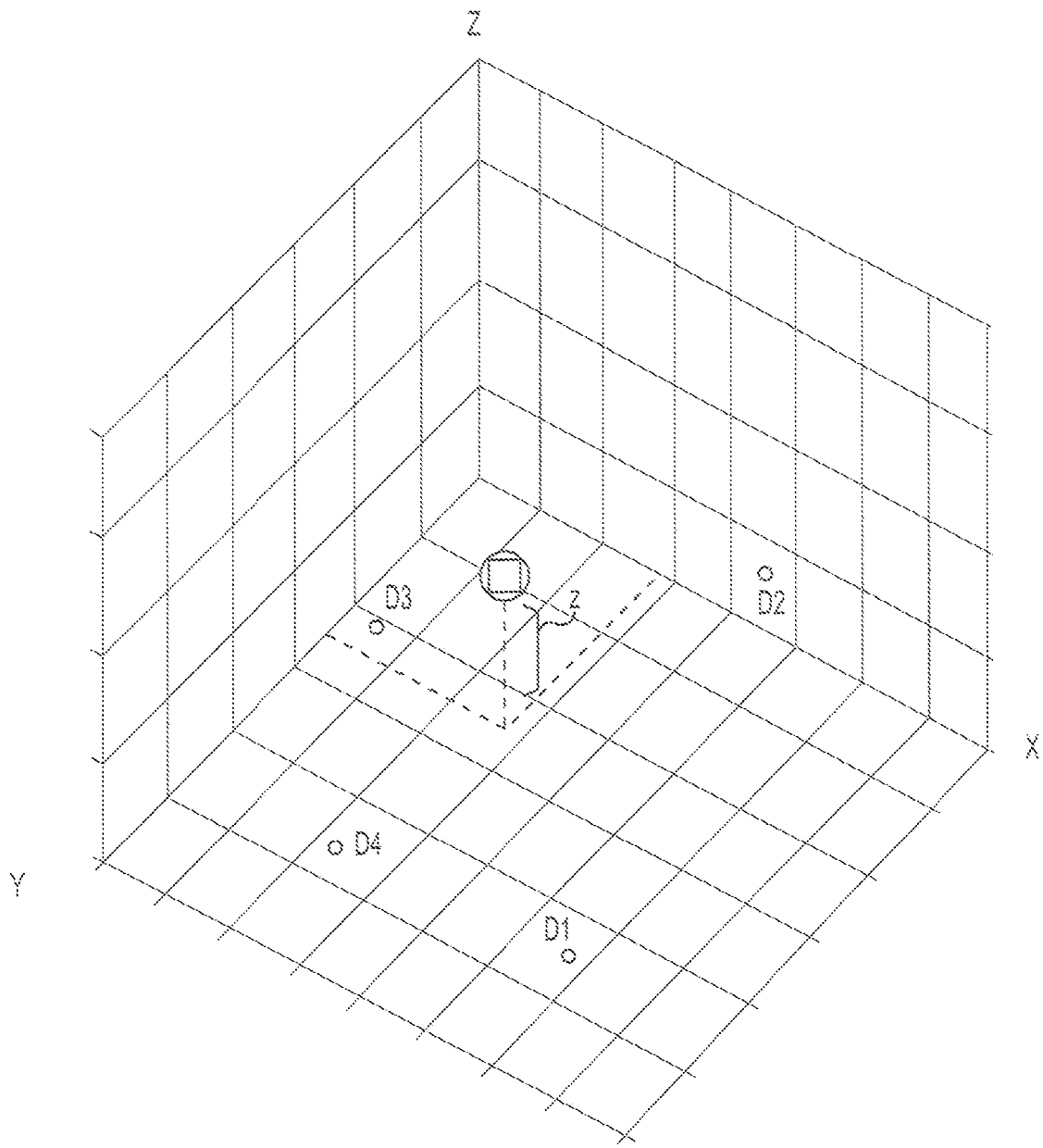
FIG. 4C (1)

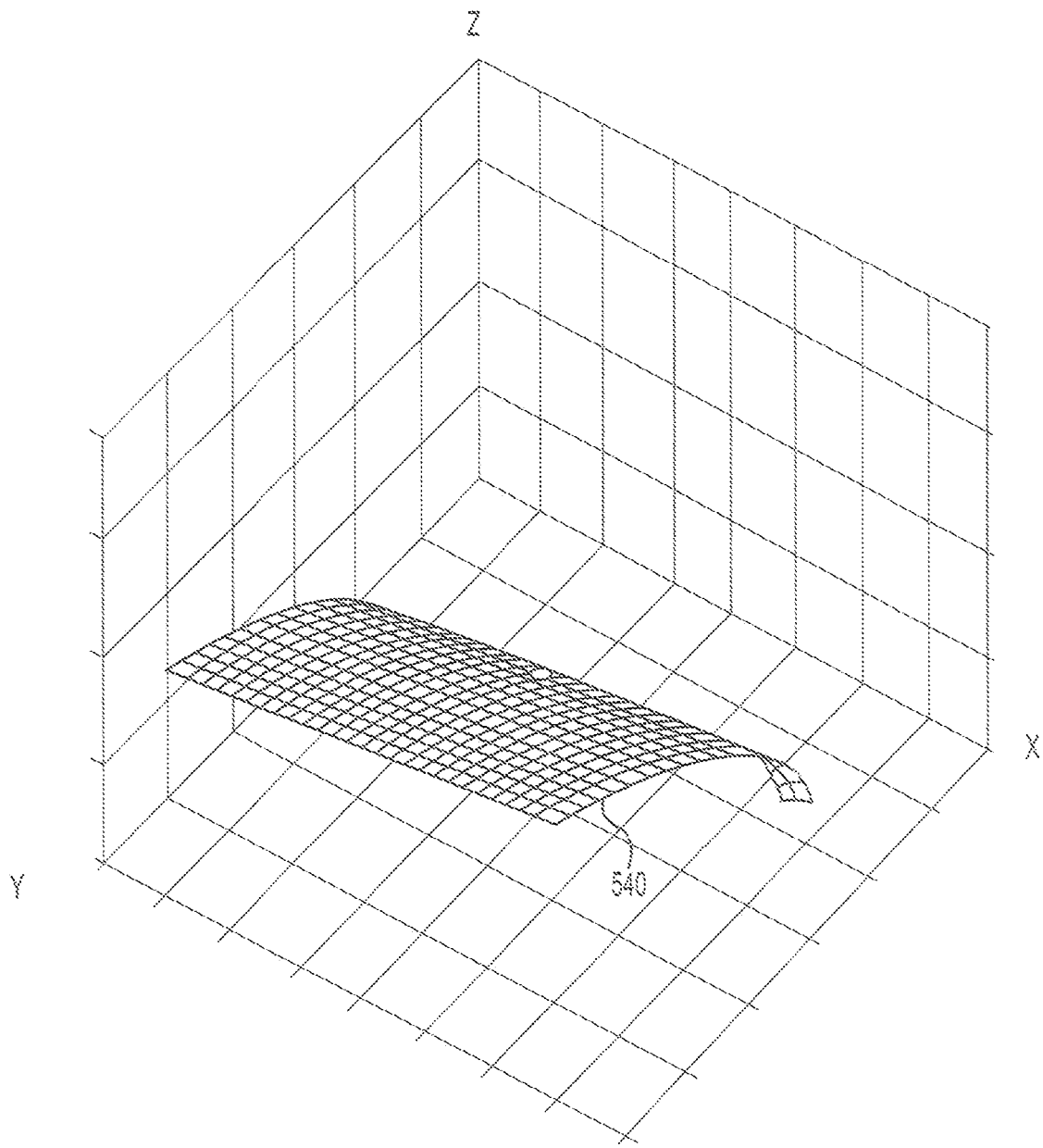
FIG. 4C (2)

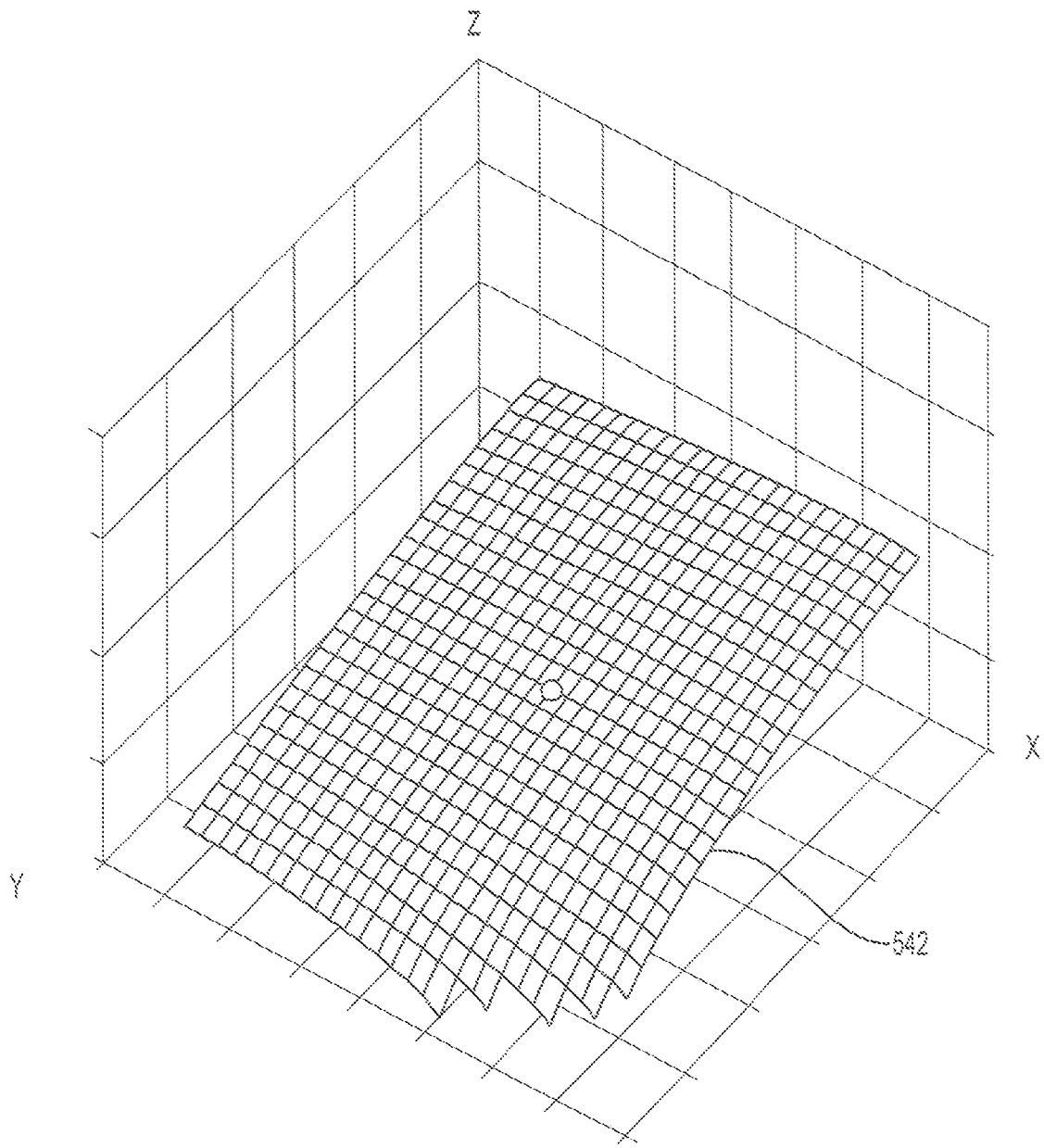
FIG. 4C (3)

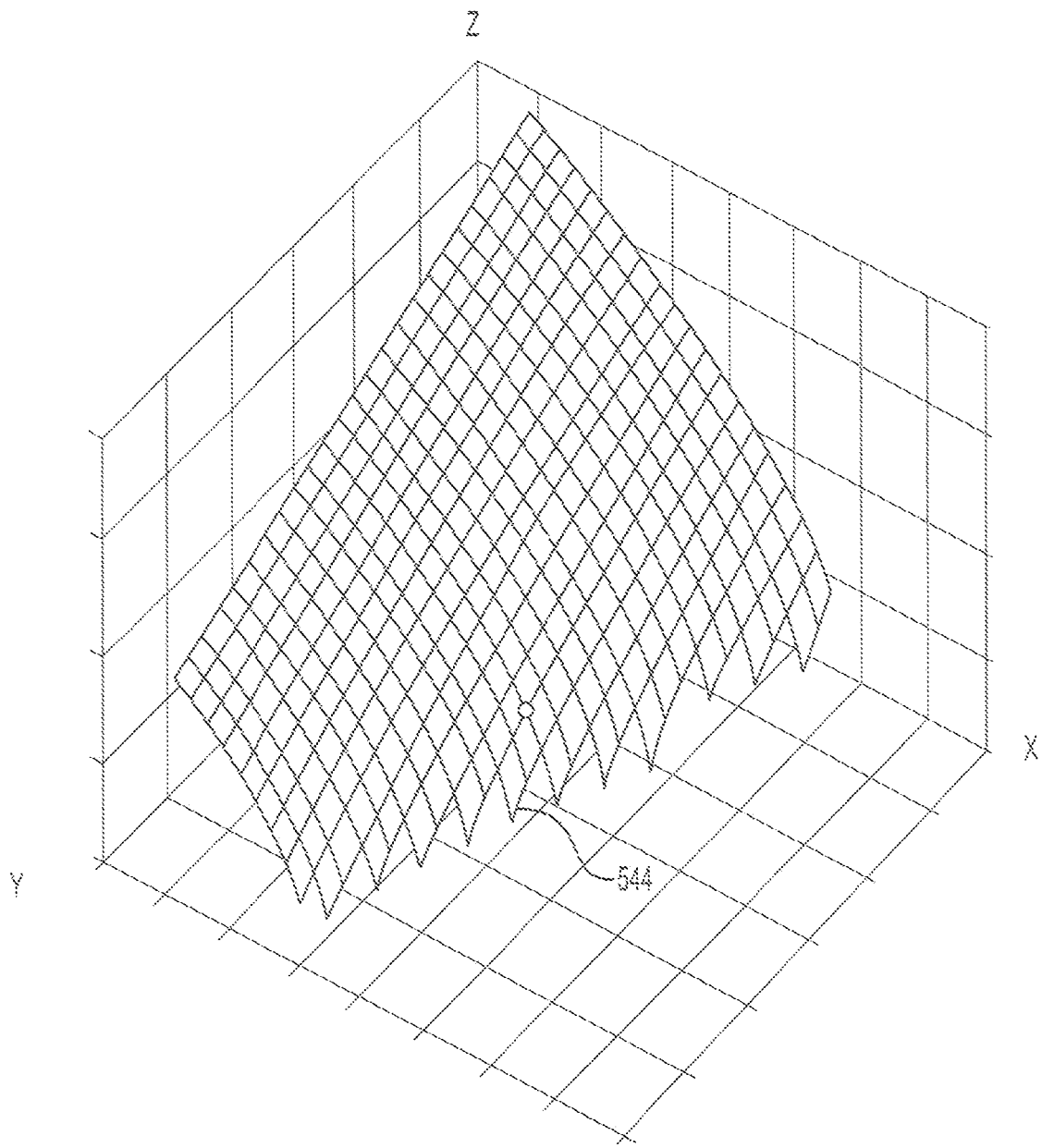
FIG. 4C (4)

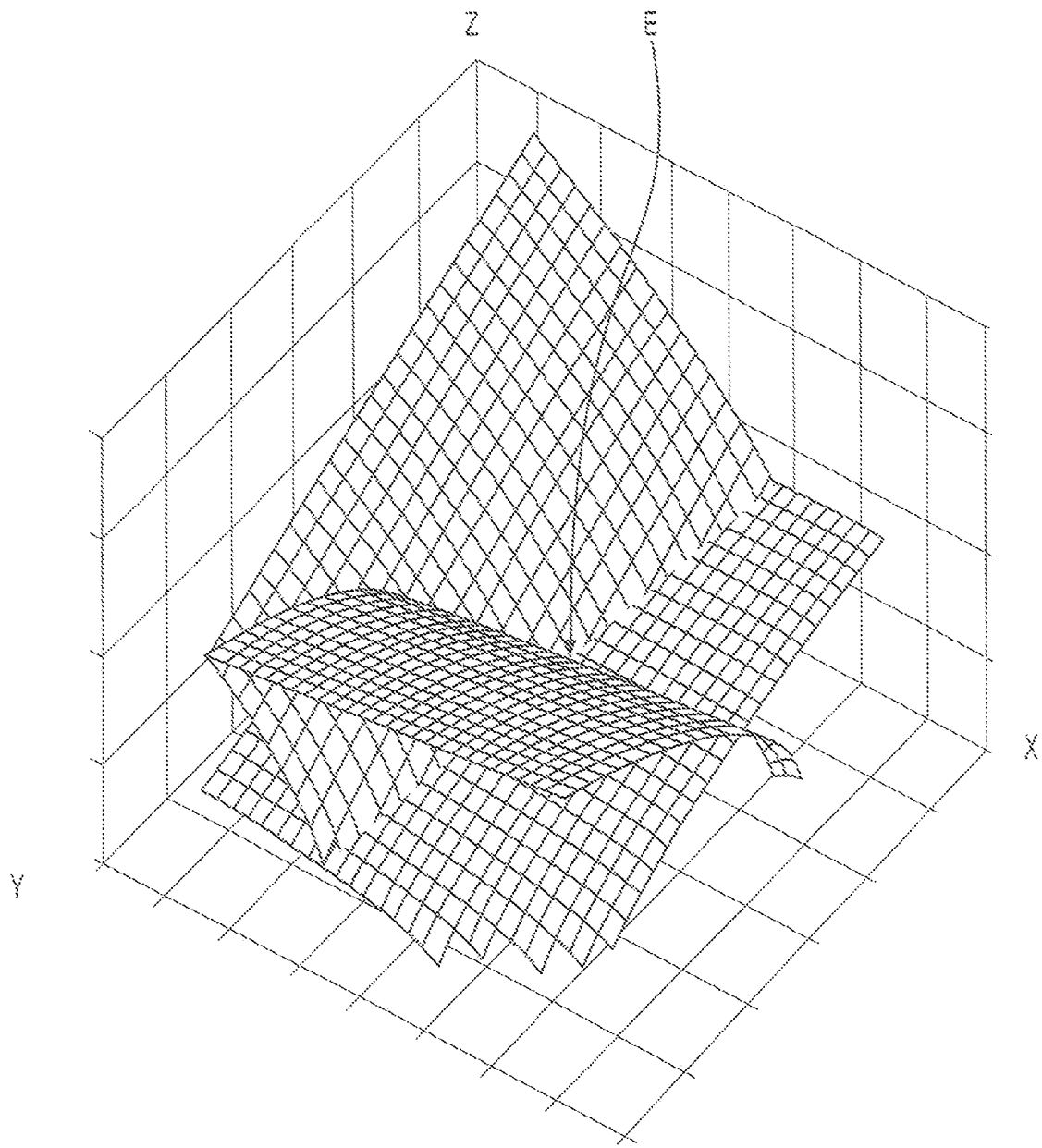
FIG. 4C (5)

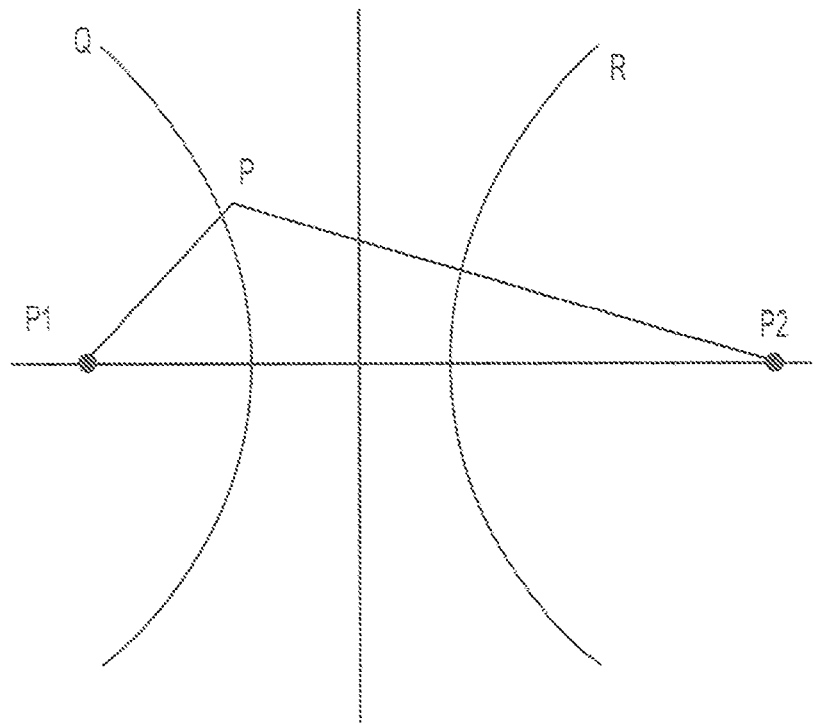
FIG. 4D (1)
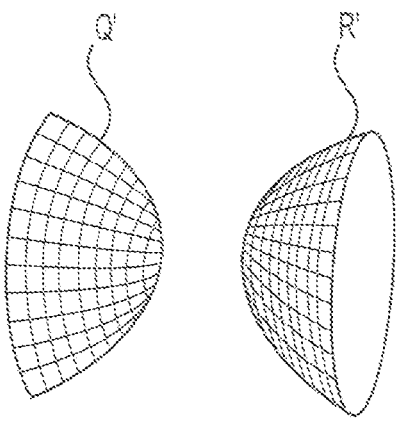
FIG. 4D (2)

MOBILE EMERGENCY PERIMETER SYSTEM AND METHOD

RELATED APPLICATIONS

This application is a continuation of U.S. patent application Ser. No. 16/709,731, filed Dec. 10, 2019, entitled "Mobile Emergency Perimeter and System and Method," now U.S. Pat. No. 11,105,888 issued Aug. 31, 2021, which is a continuation of U.S. Patent application Ser. No. 16/518, 210, filed Jul. 22, 2019, entitled "Mobile Emergency Perimeter and System and Method," now U.S. Pat. No. 10,557, 918, issued Feb. 11, 2020, which is a continuation of U.S. patent application Ser. No. 15/393,181 filed Dec. 28, 2016, entitled "Mobile Emergency Perimeter and System and Method," now U.S. Pat. No. 10,359,501, issued Jul. 23, 2019. The disclosures of these patent applications and patents are hereby incorporated by reference.

STATEMENT OF FEDERALLY SPONSORED RESEARCH

The herein disclosed inventions were made with support under 2017-33610-26640 from the U.S. Department of Agriculture (USDA). The U.S. Government may have certain rights to the inventions.

BACKGROUND

Use of unmanned aerial systems (UAS), popularly known as drones, is proliferating, and drones are in widespread use by commercial operators and hobbyists in part because of their low cost to acquire and operate. Hobbyist drones typically operate at low altitude, and Federal Aviation Administration (FAA) regulations require such drones fly only in line of sight of the hobbyist-operator. With their increasing use, hobbyist drones have been seen in situations where their presence creates a potential danger; one such situation is a wildfire where hobbyist drones have been observed operating in a restricted airspace created for firefighting aircraft. In addition, drones operated by commercial entities also could pose a danger if operated in or near the restricted airspace of a wildfire.

A popular hobbyist UAS configuration is a "quadcopter," an example of which is the SZ DJI Technology Phantom 3 Pro drone. This UAS has a maximum unobstructed range from its controller of 3.1 miles and an altitude limit of 1,640 feet. The Pro 3 drone can fly at speeds up to 16 m/sec, has a duration of 23 minutes, and weighs about three pounds. See DGI P3 Pro User Guide V1.8, March 2016.

In 2015, wildfires in the United States burned more than 10 million acres. Wildfires occur in remote areas with little or no human habitation and in urban areas where wildfires may threaten homes and businesses. Wildfire suppression techniques include low-level aerial application of fire-retardant chemicals and water; such aerial application may be by fixed wing or rotary manned aircraft. To protect aircraft crews, local, state, and Federal regulations provide for a restricted airspace in wildfire areas, and if an unauthorized UAS is observed or otherwise detected in or near the restricted airspace established for a wildfire, air operations are suspended until the UAS no longer poses a risk.

Despite these regulations, incidents of UAS operating in the restricted airspace around wildfires is increasing. While no accidents have occurred, near misses with firefighting aircraft have. A U.S. Department of the Interior press release reports for 2015 more than 20 incidents of UAS encroaching on wildfires. Two of these incidents required evasive action by firefighting aircraft to avoid a collision. In twelve of the incidents, UAS adversely affected wildfire management and one incident led to a highway corridor shutdown. The U.S. Forest Service is addressing the issue through outreach efforts to educate the public while the FAA and local authorities rely on legislation, regulations, and awareness programs; however, to date, these efforts have not stopped unauthorized UAS operations in wildfire areas.

In addition to these and other direct Federal and local government efforts, government agencies have contracted with private companies such as UAS manufacturer SZ DJI Technology to limit unauthorized UAS operations. For example, under direction of the FAA, DJI Technology provided UAS control software to create geo-fences that display approved flight areas or that physically restrict UAS flight in a GPS-coordinated area. For this geo-fencing to be effective, UAS owners must responsibly update their UAS control software so that geo-fencing can be enforced. In another effort, the FAA now publishes restricted flight areas for emergency airspace through an FAA application (app) B4UFLY (www.faa.gov/uas/wheretofly/b4ufly/); however, the B4UFLY app does not provide any mechanism for enforcing these airspace restrictions. During the 2016 fire season, the U.S. Department of the Interior tested a prototype system based on this FAA approach. Even were all UAS operators to use the B4UFLY app, a gap will exist between the time a manufacturer receives and publishes the B4UFLY coordinates for a restricted area and the time a UAS operator updates the UAS software, so this approach does not provide enough assurance for emergency personnel responding to a rapidly changing wildfire.

Private companies also offer UAS detection and mitigation systems, which may use a variety of sensors including visual cameras, sound, and thermal sensors, but these systems generally are ineffective and inappropriate for fighting wildfires because of their static design. Typically, these systems are installed in a network around fixed sites such as stadiums, prisons, and private company campuses. The systems may detect UAS at these sites and notify on-site security personnel. While these systems provide the ability to detect an intruding UAS, such detection occurs only for a fixed area with static boundaries and the systems do not provide a solution for mitigating the threat posed by a UAS. Other systems provide mitigation by, for example, employing a frequency jammer that overpowers the signal between the UAS and the UAS controller, preventing the operator from maneuvering the UAS. However, jamming may create a dangerous situation in which a UAS may crash. Furthermore, in the United States, it is illegal for members of the public and local government agencies to jam radio signals without Federal Communication Commission (FCC) approval; thus, jamming to control or prevent unauthorized UAS operations usually is not an option for state and local governments in responding to wildfires.

In summary, wildfire incident response personnel cannot effectively use detection systems that require permanent infrastructure and that only detect the presence of the UAS vehicle. Nor can they use jammers to mitigate UAS because of the risk of interfering with emergency aircraft and communications, or the risk of a UAS crashing.

SUMMARY

A mobile emergency perimeter system comprises a plurality of sensors including one or more fixed sensors, and one or more moving sensors; a wireless mesh network coupling together each of the sensors; and a central processor system coupled to the wireless mesh network. In an example, one of the plurality of sensors May be designated to provide the functions of the central processor system. The central processor system executes machine instructions stored on a computer-readable storage medium to receive time of arrival data for a RF signal transmitted by an emitter and received at each of the plurality of sensors, receive location information for each of the one or more fixed sensors and each of the one or more moving sensors, and determine a three-dimensional (3-D) estimate of the geographical location of the emitter.

A method for locating a source of a RF signal comprises receiving, at a processor, TOA data and RF signal receipt time data for each of the plurality of RF sensors that received the RF signal, wherein the RF sensors comprises fixed sensors and moving sensors; computing TDOA for each of a pair of sensors of the plurality of RF sensors; and estimating a location of the RF signal using the TDOA for each of the pair of sensors.

A system for locating a source of a radio-frequency (RF) signal comprises a plurality of RF sensors. Each RF sensor comprises a RF front end, a synchronization circuit that provides a time reference, a digitization component, wherein a received RF signal is digitized and time-stamped using the time reference, the time-stamping represents a time of arrival (TOA) of the received RF signal at the RF sensor, and a transmission component to transmit the digitized and time-stamped RF signal. The MEPS further comprises a mesh network coupling the plurality of RF sensors; and a processing component coupled to the mesh network, the processing component executing machine instructions to compute a time difference of arrival (TDOA) value for each of a pair of sensors of the plurality of sensors, wherein the processing component receives the TOA at each RF sensor of the plurality of RF sensors, computes the TDOA as a difference of TOA at each RF sensor of a pair of RF sensors, and computes a geographic position of the source of the RF signal using the TDOA of three or more pairs of RF sensors.

A method for establishing and controlling a mobile perimeter at a fixed or moving geographic location and for determining a geographic location of an emitting radio frequency (RF) emitter in a vicinity of the mobile perimeter, includes at each of a plurality of RF sensors: receiving an RF transmission, processing the received RF transmission to produce RF signal data, and wirelessly transmitting the RF signal data to a central station. At the central station, a processor executes a cross-correlation process to: compare characteristics of pairs of RF signal data; based on the compared characteristics, determine a time difference of arrival (TDOA) between RF transmissions received at each RF sensor of a pair of RF sensors, and repeats the cross-correlation process for each pair of RF sensors from which RF signal data are received. Using the TDOA values for two or more pairs of RF sensors, the processor determines a location estimate for the RF emitter.

DESCRIPTION OF THE DRAWINGS

The detailed description refers to the following figures in which like numerals refer to like items, and in which:

FIGS. 4A-4D(2) illustrate aspects of RF propagation and detection in the environment of FIG. 1A;

DETAILED DESCRIPTION

Figure 1A:
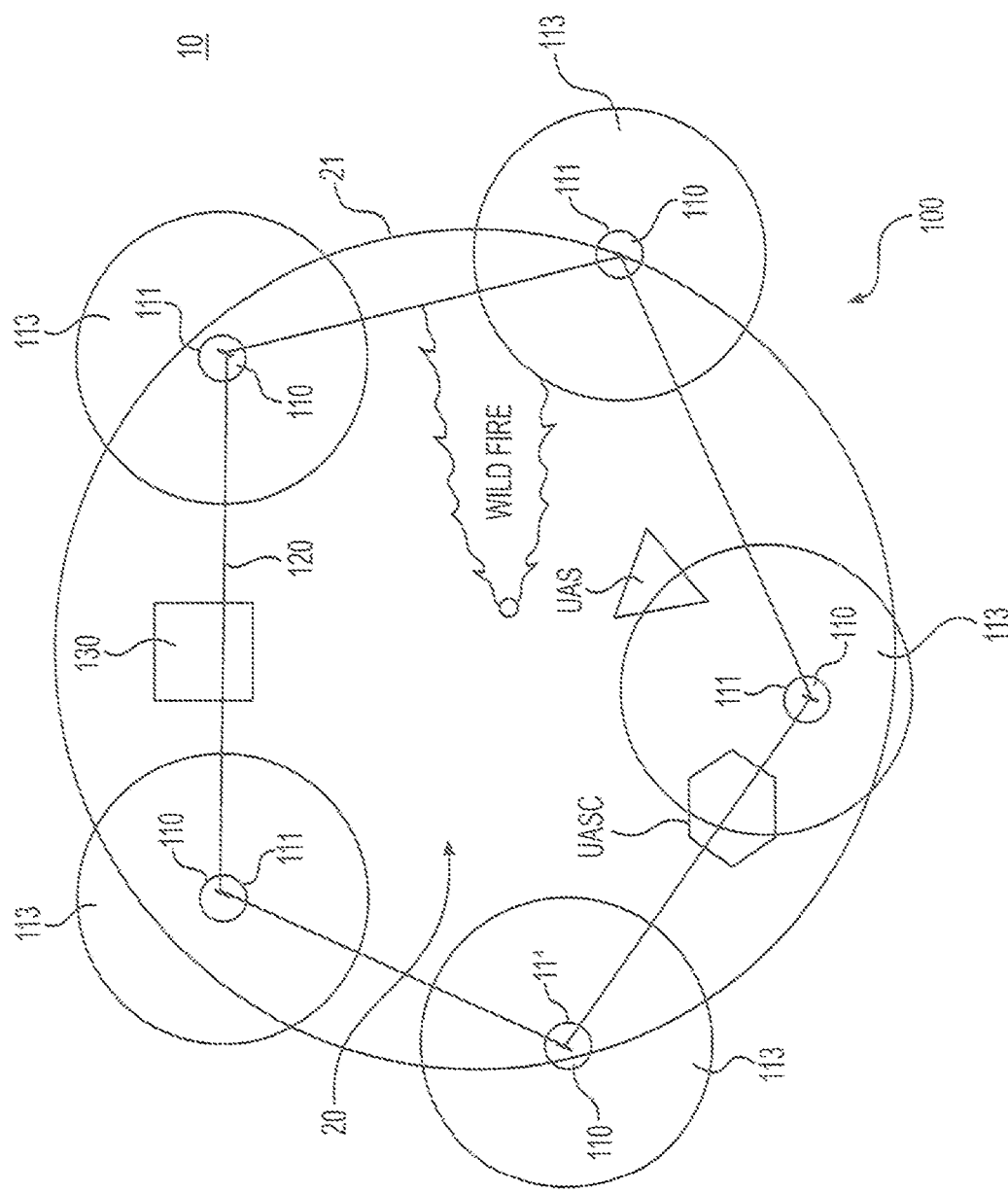
FIG. 1A illustrates an environment in which an example of a mobile emergency perimeter system (MEPS) may be implemented to detect and locate UAS controllers.

The Federal Aviation Administration (FAA) typically designates a temporary flight restriction (TFR) for the airspace around a wildfire to limit access to aircraft (manned and unmanned) that are not directly supporting wildfire suppression. If the wildfire grows, the TFR may be expanded, but wildfires can spread quickly and unpredictably and updates to the TFR may significantly lag the area where wildfire crews are operating.

The nature of aerial firefighting—with low-flying, close-proximity aircraft, in smoky conditions, and with rugged terrain—is inherently dangerous. Nevertheless, air operations are critical to the rapid suppression of wildfires. If wildfire suppression is impeded, for example, because of unauthorized UAS operations, property losses can quickly escalate resulting in significant expenses for property owners, insurance companies, and local, state and Federal agencies responsible for combatting the wildfire as well as post-wildfire recovery.

When an unauthorized UAS is observed or otherwise detected in or near a wildfire, air operations may be suspended until the UAS no longer possess a risk to air crews. Increased UAS use among hobbyists and commercial operators poses a threat to firefighters, and relying of the TFR by itself as a deterrent to UAS intrusions is insufficient. To address this threat, disclosed herein is a rapidly deployable and reconfigurable system, and corresponding method of use, that works in all types of terrain and under extreme conditions to help authorities identify and halt unauthorized UAS operations in the restricted airspace (i.e., the TFR) around wildfires. In an example, a method for establishing and controlling a mobile perimeter at a fixed or moving geographic location and for determining a geographic location of an emitting radio frequency (RF) emitter in a vicinity of the mobile perimeter, includes, at a central station, a processor receiving intercepted RF data from two or more of a plurality of RF sensors in the vicinity of the mobile perimeter, the intercepted RF data comprising a time of arrival and a frequency, two of the RF sensors comprising a pair of RF sensors; and the processor executing a cross-correlation process to compare characteristics of intercepted RF data from one or more pairs of RF sensors, based on compared characteristics, determine a time difference of arrival (TDOA) between RF transmissions received at each RF sensor of a first pair of RF sensors, and repeat the cross-correlation process for each additional pair of RF sensors from which RF signal data are received. Using TDOA values for two or more pairs of RF sensors, the processor then computes a location estimate for the RF emitter.

More specifically, disclosed is a mobile emergency perimeter system (MEPS), and corresponding method of use, that, in an example, employs multilateration and optionally, mesh networking, to quickly locate the source of radio frequency (RF) signals that control an unauthorized UAS. The MEPS, while especially suitable for an emergency such as a wildfire, may be used in any number of other locations where unauthorized UAS may be found, including fixed locations and locations with movable boundaries. The herein disclosed MEPS may be deployed to form a mobile perimeter that in the case of a wildfire, defines a monitored area. The mobile perimeter may enclose a buffer zone around the wildfire and a corresponding TFR to allow for growth or movement of the wildfire.

UAS controllers typically use one or more radio frequencies to communicate with a UAS; in some UAS systems, the UAS may send video and other data to the UAS controller or to another device. Two of the most common frequencies used to control hobbyist UAS center around 2.4 GHz and 5.8 GHz. These frequencies are considered line of sight (LOS), and the RF control signal may degrade when obstructed by objects such as structures, trees, or terrain. In most environments, the UAS controller transmits the strongest RF signal in the above-noted frequency ranges, which means the UAS operator's location may be the strongest signal source and therefore the easiest to detect.

Multilateration relies on a time difference of arrival (TDOA) of a signal from a transmitter (e.g., the UAS controller) at two different RF receivers whose locations are known. Given a pair of receivers at known locations, a specially-programmed processor can derive a location solution, which may be represented visually as a three-dimensional surface (characterized as a hyperboloid) representing the universe of possible UAS controller locations. Additional receiver pairs may be used to generate additional location solutions, which may be used to improve positional accuracy. Time-difference of arrival requires accurate calibration of time and position between the RF receivers to accurately estimate the location of the RF signal source. The MEPS provides automated time and position calibration by communicating between a processor system and the sensors. The MEPS may operate using a network that includes one or more moving sensors. This mobility may allow the MEPS to overcome obstacles such as rugged terrain and trees, lack of available power, and smoke, dust, and heat, which otherwise could adversely affect multilateration performance. The MEPS may be deployed or redeployed in ways that allow adequate coverage of the airspace while maintaining UAS controller location determination accuracy. Such deployments may include a combination of sensor airdrops, adding sensor equipment to existing aircraft and ground-based vehicles, and other deployment options.

The MEPS may detect the RF control signals emitted from a UAS controller (the RF control signals may be sent in burst transmissions rather than continuous transmissions). Once the MEPS detects a UAS controller in or near the restricted airspace (the TFR), the MEPS may provide an alert and may provide the approximate location of the UAS controller. The MEPS may use the UAS controller's approximate location to determine if the UAS is authorized/known (e.g., supporting wildfire suppression) or if the UAS is unauthorized. For example, the MEPS may detect and track locations of authorized UAS controllers. If the UAS is not authorized, the MEPS may provide authorities with the approximate location of the UAS controller.

In an example, the MEPS includes three or more MEPS sensor nodes as well as a processor system. In an aspect, the MEPS sensor nodes may form a mesh network. A MEPS sensor at each MEPS sensor node may use passive detection of an RF signal indicative of UAS operation as an input to the processor system, which uses the inputs to estimate the location of the a UAS controller and by extension, locate the UAS operator, based on the multilateration technique of time-based signal reception. Additional MEPS sensors may be deployed to increase the accuracy of the location estimate. A minimum of three MEPS sensors may be deployed to determine a 2-D (horizontal) UAS controller location (this may be sufficient to locate a ground-level transmitter); four sensors may be used to provide a full 3-D (x, y, z) location. See examples illustrated in FIGS. 4B and 4A, respectively. Each MEPS sensor may include an RF receiver that passively listens for RF signals on frequencies used for UAS communication. The MEPS sensor also may include an RF transmitter that sends detected signal data to the processor system for correlation with data from other MEPS sensors. Multilateration requires that each MEPS sensor's location is known and that RF detections be synchronized. In an example, as part of each MEPS sensor, a GPS component provides the MEPS sensor with accurate location data and a highly-accurate clock, which may provide both time and location calibration for the sensors. To further improve performance, the MEPS also may employ tracking and smoothing of time and location. The MEPS sensor communicates with the MEPS processor (directly or via other MEPS sensors) using, for example, the wireless mesh network.

in an example, the MEPS sensors may be embodied in or may incorporate software-defined radios (SDRs). An SDR provides low-cost RF signal acquisition and processing. In an example, an SDR in each MEPS sensor allows the MEPS sensor to scan for candidate RF transmissions across a wide range of frequencies, down convert the received RF signal, digitize and then time-stamp the digitized signal and send the time-stamped signal to the processer system. The SDR also may provide filtering and RF classification functions.

During a wildfire, the MEPS supports different sensor deployment options, as dictated by the variability of terrain where wildfires occur. In some wildfire areas, the MEPS may use a hybrid sensor deployment strategy that includes both ground and airborne MEPS sensor nodes, which may be utilized individually, or together. For example, MEPS sensors may be attached to manned and unmanned aircraft that support wildfire suppression, air-dropped from aircraft onto ridges or remote locations, tethered to balloons (although this is a potential hazard to manned aircraft), mounted on ground vehicles, or carried by wildfire suppression personnel (for example, in a backpack). This hybrid deployment provides a robust array of sensors; such a hybrid array of MEPS sensors may contribute to more accurate line of sight detection of UAS RF frequencies in variable terrain situations.

FIG. 1A illustrates an environment 10 in which an example mobile emergency perimeter system (MEPS) 100 may be implemented to detect and locate UAS controllers, and particularly, unauthorized UAS controllers (UASC). In FIG. 1A, a wildfire exists within an area 20 defined by perimeter 21. Perimeter 21 may expand or contract or otherwise change shape and/or move depending on the nature and path of the wildfire and corresponding wildfire suppression efforts. The perimeter 21 may encompass an area much larger than the actual area of the wildfire. The area 20 may include a temporary flight restriction (TFR) area and a buffer area. However, configured, the area 20 encompassed by the perimeter 21 may constitute an area in which wildfire suppression aircraft may operate at an altitude where risk of collision with a UAS exists and, therefore, may constitute an area in which detection and location of unauthorized UAS controllers is desired.

To detect and locate unauthorized UAS controllers, the MEPS 100 includes passive MEPS sensors 110. Each sensor 110 is part of a MEPS sensor node 111. The sensors 110 and the nodes 111 form, in an example, mesh network 120. In the example of FIG. 1A, five sensors 110 form pentagon-shaped mesh network 120. However, the number of sensors 110 may be fewer than five (but not less than three) or more than five.

The sensors 110 may be placed on fixed or mobile platforms. Examples of mobile platforms include vehicles and authorized UAS or other aircraft. When a sensor 110 is attached to a UAS, the UAS may operate at a frequency other than 2.4 or 5.8 GHz to avoid interference with the MEPS 100. The sensors 110 also may be placed with balloons, and the balloons may be tethered (essentially fixed, although the tether anchor may be moved) or may be mobile. As discussed herein, having one or more sensors 110 placed at low altitude may be advantageous in terms of detecting a UAS controller, although such placement may pose a risk to wildfire suppression aircrews.

Each sensor 110 has a theoretical range for passive detection of RF signals. In some circumstances, the actual detection range may be much less than the theoretical detection range; for example, the actual detection range may be limited to line of sight, and in a hilly topography, that range could be less than in a flat topography. Furthermore, while UAS generally operate within discrete frequency bands, other RF signals may interfere with UAS signals, and thus may complicate detection of UAS controllers. In the example of FIG. 1A, absent an interfering object or topography, each sensor 110 has a generally or actually circular area of detection 113 for RF signals.

The sensors 110 may be deployed and redeployed so that their individual areas of RF signal detection 113 overlap to either completely cover the area 20, cover the perimeter 21, or cover a subset of the perimeter 21 and a subset of the area 20. In the example of FIG. 1A, the five sensors 110 are deployed to provide RF detection in the area 20; however, the sensor deployment in the example of FIG. 1A appears not to provide RF detection capability over the entire area 20. The RF coverage may be increased by deployment of additional sensors 110. The actual adequacy of RF coverage in the wildfire area 20 may be tested initially when the sensors 110 are deployed, and adequacy of RF coverage may be tested and re-confirmed while the wildfire area 20 is maintained. Examples of tests for RF coverage adequacy are disclosed herein.

The mesh network 120 may be wireless. In an aspect, a sensor 110 in mesh network 120 may communicate with one or more other sensors 110 in the mesh network 120; generally, each sensor 110 may communicate with each of the other sensors 110. One sensor node 111 in the mesh network 120 may include a processor system (not shown) that, among other functions, performs some multilateration computations of the MEPS 100. Alternately, the processor system may be embodied in separate central station 130. In another example, some or all multilateration computations are performed at more than one sensor node 111 in the mesh network 120. The sensors 110 may communicate with each other and with the processor system using standard wireless protocols. In an example, each sensor 110 in the mesh network 120 has information necessary to forward data (e.g., the sensor's TOA data) to the processor system at the central station 130. Certain sensors 110, such as those within line of sight of the central station 130 may send data directly to the central station 130. Other sensors 110 may send data by "hopping" to intermediate sensors 110, which in turn forward the data to the central station 130. If a sensor 110 in the mesh network 120 is disabled, that disabled sensor 120 is bypassed when data are sent to the central station 130.

Figure 1B:
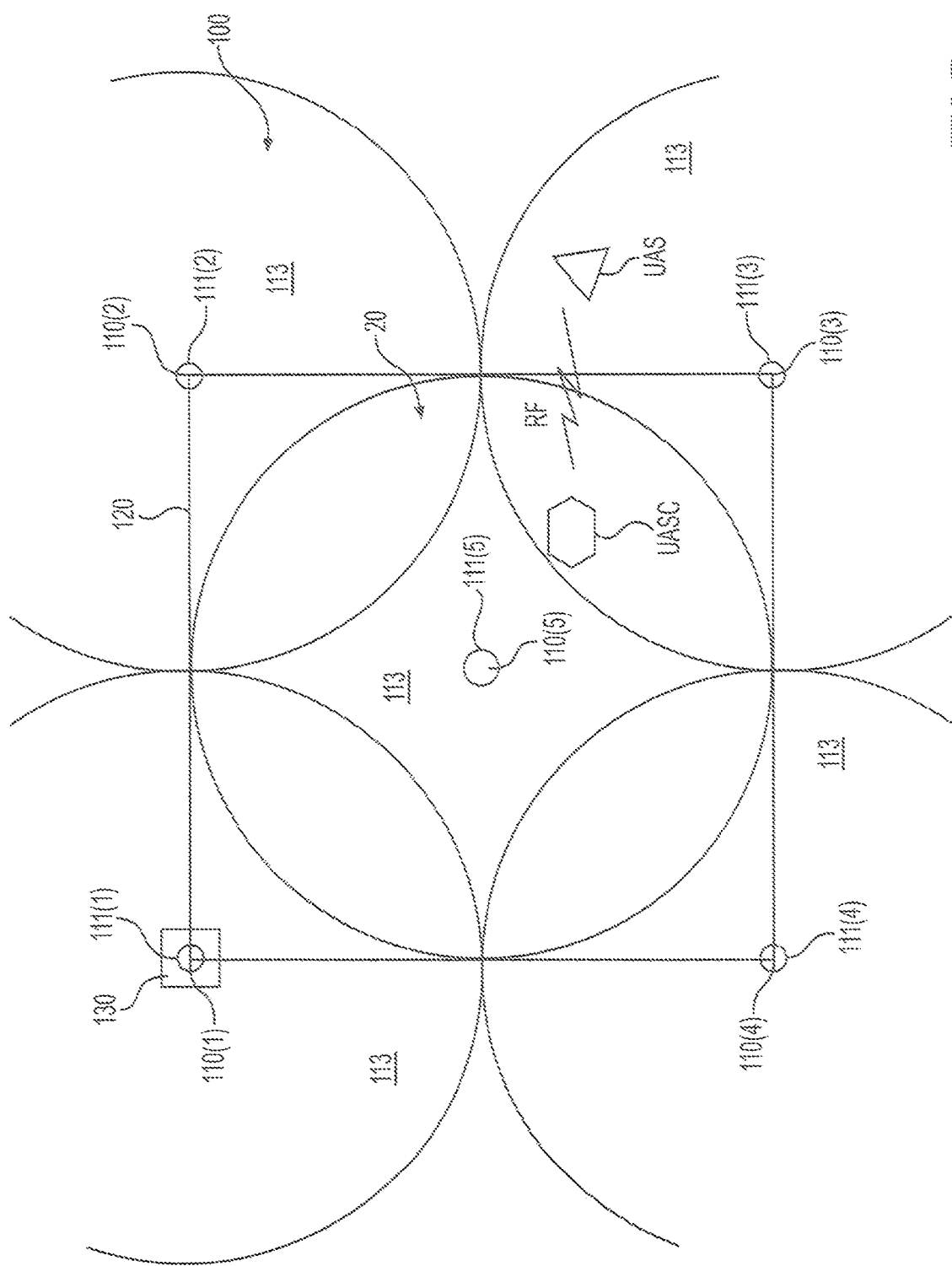
FIG. 1B illustrates a deployment plan for sensors used with a MEPS.

FIG. 1B illustrates an alternate deployment plan for the sensors 110. In FIG. 1B, five sensors 110 are deployed in a square pattern with one sensor 110 in each corner of the square and one sensor 110 in the middle of the square. As discussed herein, setting aside any considerations as to terrain, tree density and other obstructions, such a sensor deployment pattern may be optimum in terms of area coverage and accuracy of the UAS controller location estimate. As can be seen in FIG. 1B, the five sensors 110 are deployed to cover the entire area 20.

Figure 2A:
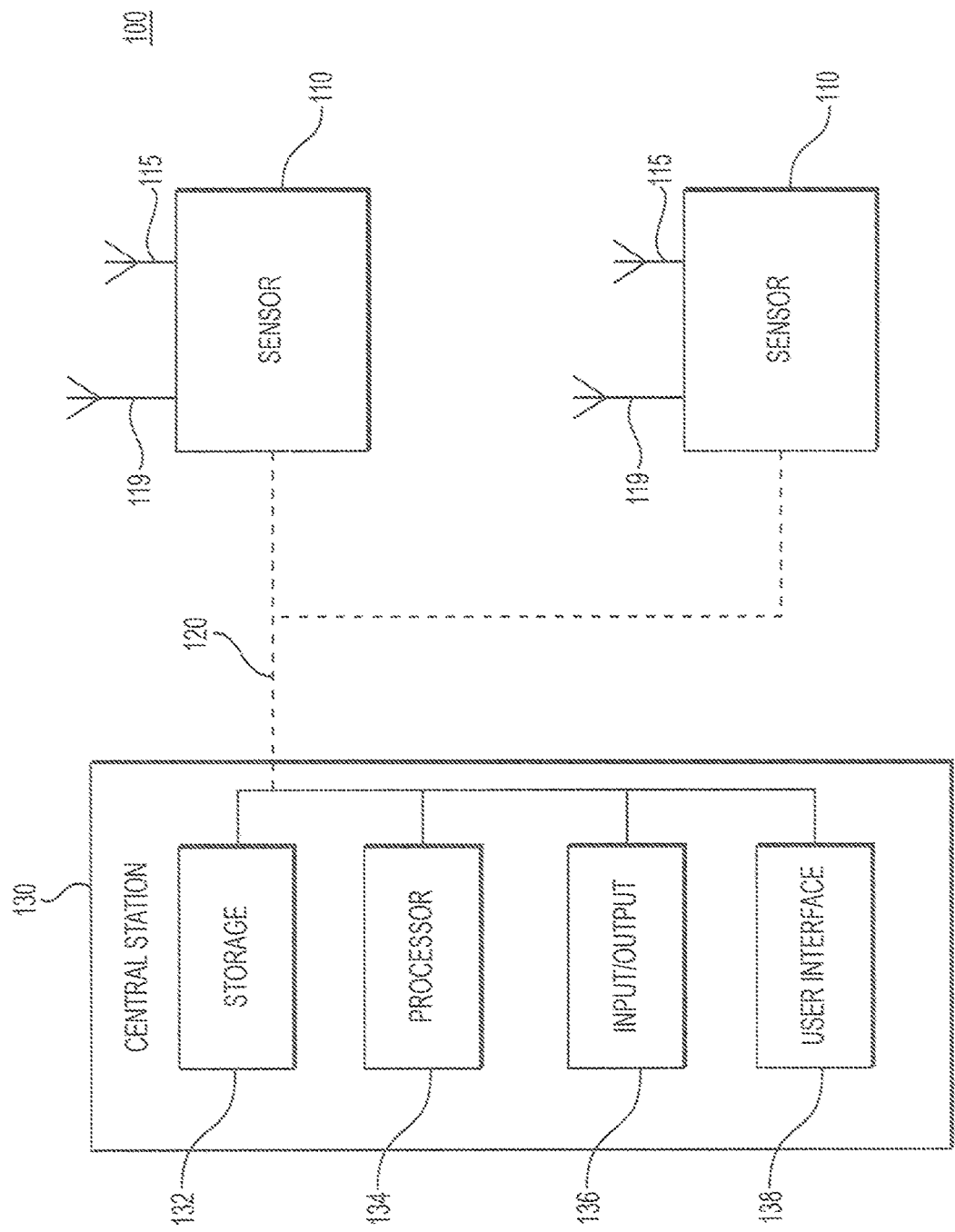
FIGS. 2A-2C illustrate components of an example MEPS.

FIG. 2A illustrates example hardware components of the MEPS 100. In addition to passive RF sensors 110, in an example, the MEPS 100 includes the central station 130 with which the sensors 110 communicate. The central station 130 in turn includes non-transient data and programming storage component 132, processor system 134, input/output device 136, and user interface device 138. All components of the central station 130 may be co-located; alternately, one or more components of the central station 130 may be dispersed. The central station 130 may be implemented on or carried by a mobile device such as a vehicle or aircraft. Alternately, the central station 130 may be at a fixed location (for example, inside perimeter 21—see FIG. 1A). In an example, the central station 130 also may perform all the functions of a sensor 110.

The storage component 132 may be a hard disk, an optical disk, or any other device capable of storing machine instructions for operation of the MEPS 100 as well as storing data collected by the MEPS 100 and other data used in operation of the MEPS 100. The processor system 134 provides memory and processing functions for the MEPS 100. The input/output device 136 includes mechanisms for human operation and control of the MEPS 100 and data input and output and command functions for other components of the MEPS 100. The input/output device 136 may include wireless communications mechanisms that allow reception and transmission of digital and analog data to and from the sensors 110, and transmission of commands to the sensors 110. The input/output device 136 also may include mechanisms for semi-autonomous and fully autonomous operation of the MEPS 100. In an example, the MEPS 100 may be configured for semi-autonomous operation (i.e., some human control) or fully autonomous operation. The user interface 138 may include a graphical user interface.

Figure 2B:
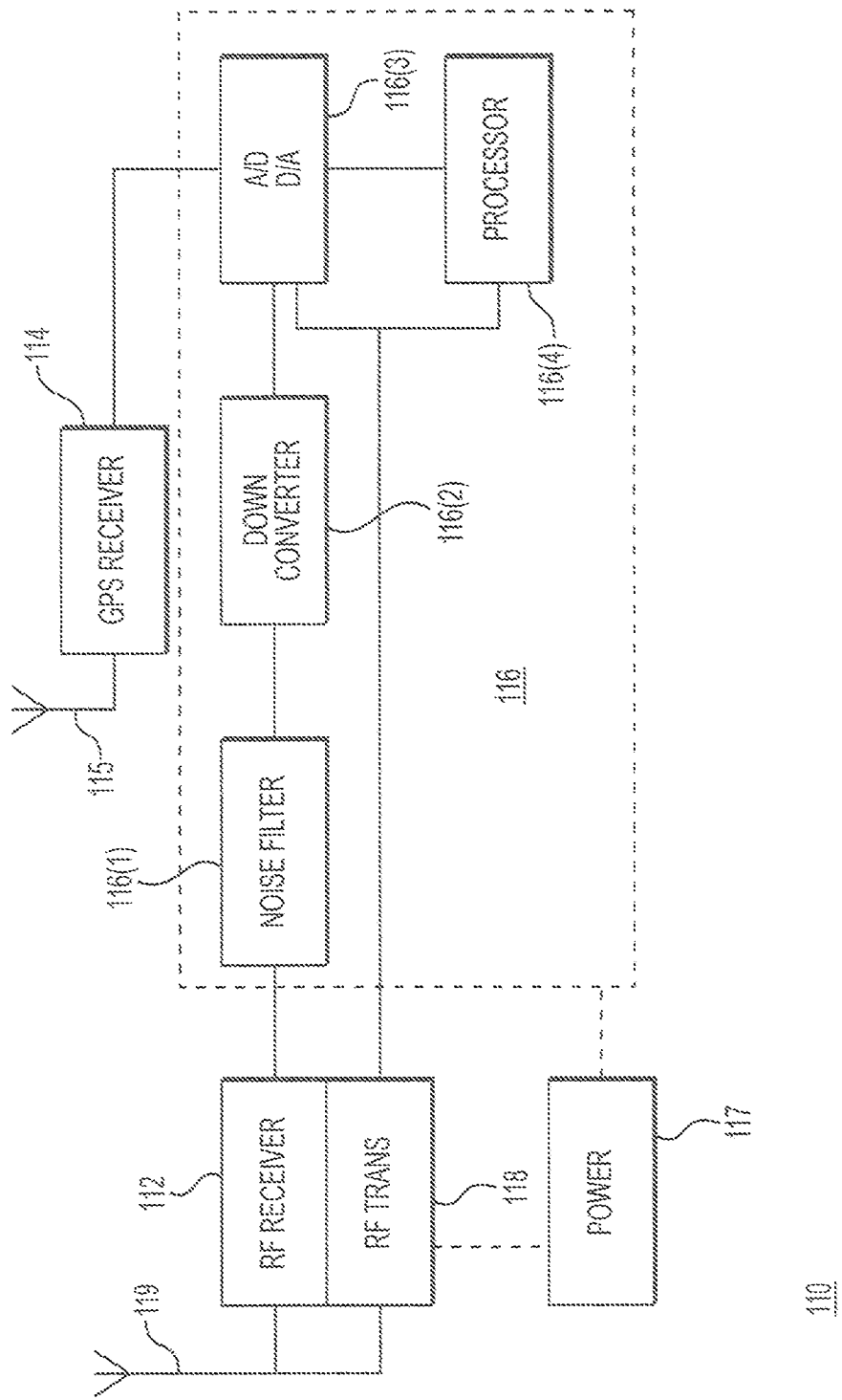

FIG. 2B is a block diagram of a sensor 110. In FIG. 2B, sensor 110 includes RF receiver 112, GPS receiver 114, GPS antenna 115, processing component 116, RF transmitter 118, and receive/transmit antenna 119. The antenna 119, the RF receiver 112, and some elements of the processing component 116 may be analog (the RF signal being analog) and may be referred to as the RF front end. In an example, the sensor components are implemented as a fully duplex software defined radio (SDR). The RF receiver 112 performs at least two functions: (1) receiving (detecting) RF signals emanating from a UAS controller in or near the area of a wildfire, and (2) receiving RF signals from other RF receivers 112 in sensor network 120. Corresponding RF transmitter 118 sends signals and data to other sensors 110 and to central station 130.

The sensor 110 also includes local power supply 117, which may include a rechargeable or replaceable battery power system and optionally a solar energy power system. The power supply 117 may include various power conservation elements, such as, for example, a low-power mode that is invoked as wildfire suppression efforts dictate. For example, the power supply 117 might shift to a low power mode if no RF signals are detected for a predetermined time. As noted herein, power consumption by a sensor 110 may be reduced by performing as much of the MEPS computational load at the processor system 134.

The GPS receiver 114 may receive an initial location update to fix its position in the mesh network 120. Thereafter, the GPS receiver may receive signals to verify its position. When a sensor 110 is configured with a mobile sensor node, the frequency of GPS updates may increase. The GPS receiver 114 also may provide an accurate clock signal, which may be used to determine time of arrival for RF signals received at the sensor 110. The time of arrival (TOA) may be used to time-stamp each received signal for subsequent TDOA processing. See FIGS. 6A-9C.

The processing component 116 includes a down converter 116(2) that down converts the analog RF signal to a baseband signal and an analog to digital (A/D) converter 116(3) that converts the baseband signal to a digital signal, and a corresponding D/A converter. In an example, the sensor 110 may incorporate a local clock (not shown in FIG. 2B), which may be used to time-stamp the digitized baseband signal. Options for differing clocks and time-stamping are discussed with respect to FIGS. 7A-9C. The processing component 116 also may include a noise filter 116(1) and a programmed processor 116(4).

The noise filter 116(1) smooths the RF signal and minimizes the effect of environmental noise. The processor 116(4) executes program instructions to operate the sensor 110 and to perform local data processing functions when those functions are to be carried out at the sensor level. For example, a sensor 110 may perform TDOA calculations and provide the TDOA data to the central station 130.

The antenna 119 may be omni-directional and also may incorporate some form of beam steering or directionality. The antenna 119 may be a hardware antenna or may be a software defined antenna. The antenna 119 may be used for transmission and reception. The antenna 119 may enable digital and analog signaling. Alternately, the sensor 110 may include a separate antenna (not shown) for digital signaling.

Figure 2C:
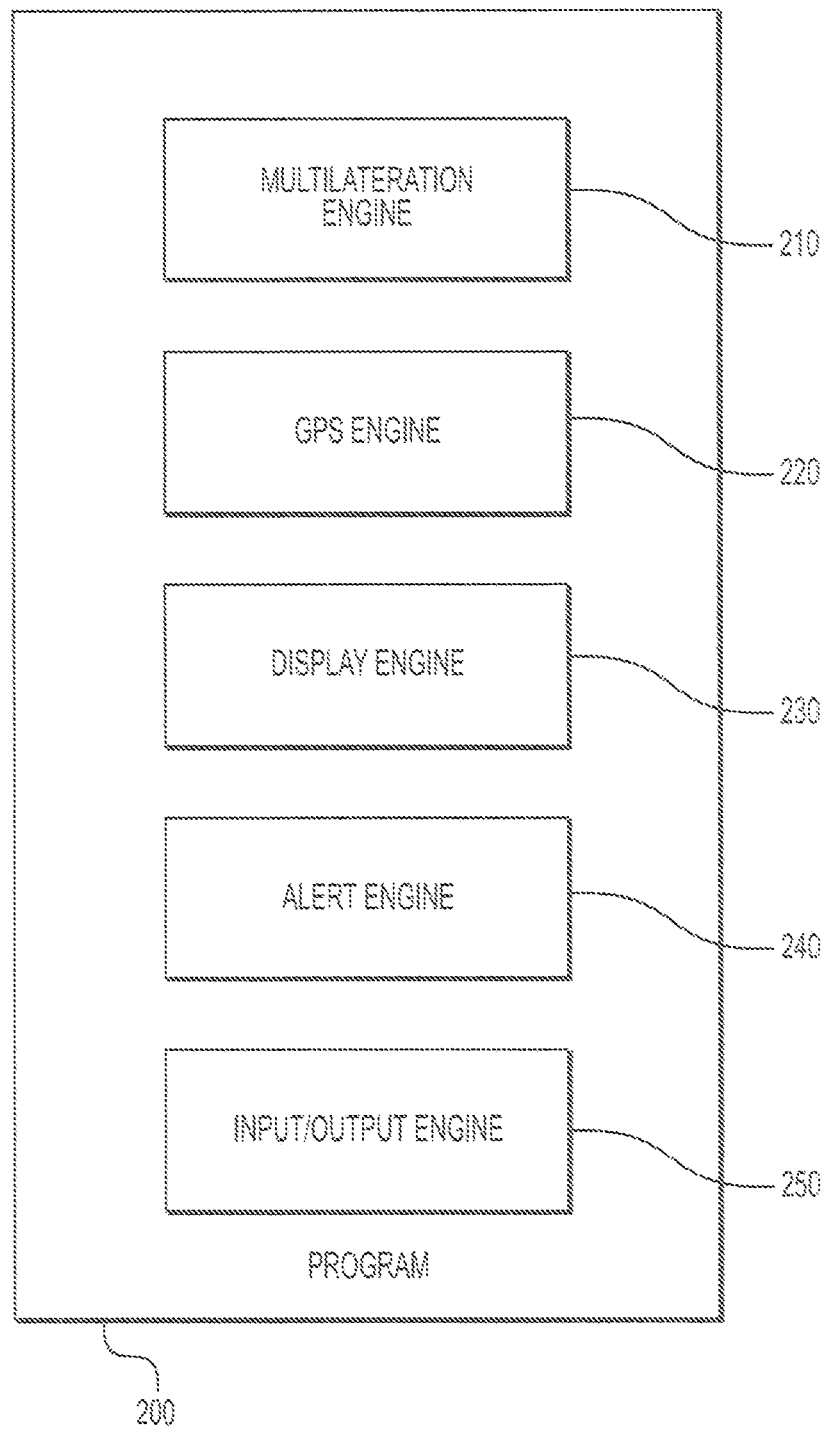

FIG. 2C is a block diagram of example software components of the MEPS 100. In FIG. 2C, software system 200 is embodied as computer code stored on non-transitory computer-readable storage medium 132 and includes multilateration engine 210, GPS engine 220, display engine 230, alert engine 240, and input/output engine 250. The software system 200 may use, as inputs, data that include sensor location, UAS controller location, TRF boundaries, and wildfire suppression aircraft data (time on station, location, projected flight path (course and altitude), and mission profile). In addition, in an example, the central station 130 may include, or may access, an automatic dependent surveillance—broadcast (ADS-B) system in which a fire suppression aircraft determines its position by satellite navigation and periodically broadcasts the position, enabling the fire suppression aircraft to be tracked. The central station 130 may provide this information as an input to the processor system 134.

The multilateration engine 210 provides programming and algorithms that are executed by the processor system 134 to provide a two- or three-dimensional position estimate for a UAS controller. The algorithms are based on a time difference of arrival (TDOA) of a signal emitted by the UAS controller and received at three or more MEPS sensors 110. As disclosed herein, the TDOA computation may be based on time of arrival (TOA) data or on cross-correlation data. When emitted from a UAS controller, an RF signal generally will arrive at slightly different times at two spatially separated sensors 110, the TDOA being due to the different distances of each sensor 110 from the UAS controller. For given locations of two sensors 110, a set of UAS controller locations would give the same measurement of TDOA. Given two receiver locations and a known TDOA, the locus of possible emitter locations may be represented visually as one half of a two-sheeted hyperboloid. This operation of the multilateration engine 210 is described with respect to FIGS. 4A-4E and FIGS. 6A and 6B. In some examples, some of the operations executed by the multilateration engine 210 may be performed at the local processor level by the processor 116(4).

Figure 3A:
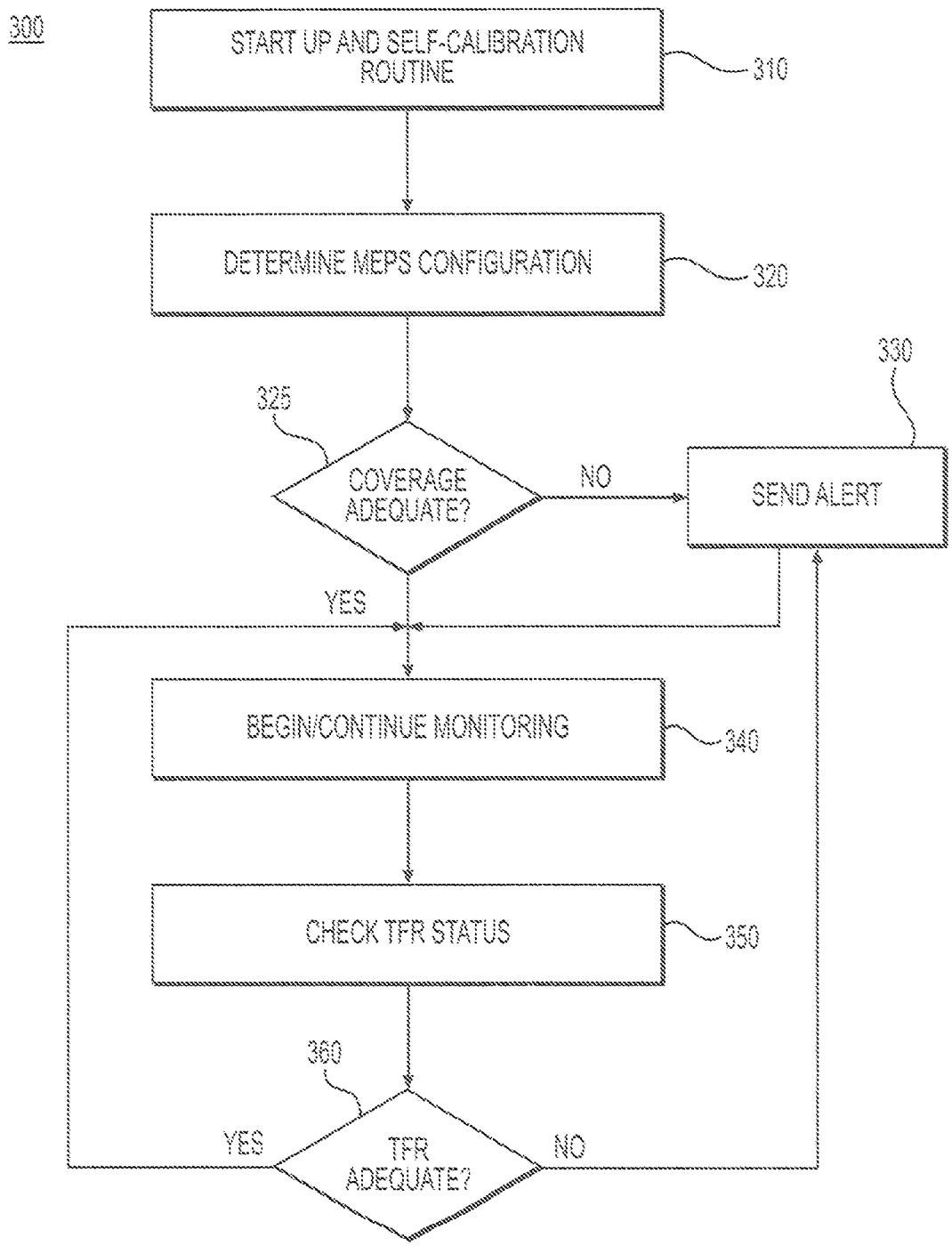
FIGS. 3A-3C illustrate example methods executed by the MEPS of FIGS. 2A 2C.

FIG. 3A is a flowchart illustrating an example method for operating the MEPS 100 of FIGS. 2A-2C. In FIG. 3A, method 300 begins in block 310 when MEPS sensors 110 are directed by central station processor system 134 to execute a startup and self-calibration routine. The self-calibration routine verifies adequate power to operate the sensor 110, to verify the geographic location using GPS signaling, and to verify clock accuracy for time-stamping detected RF signals. The self-calibration routine also may verify the ability of the deployed sensors 110 to completely or partially cover the area 20 so that any unauthorized UAS controllers are detected with a specified confidence level. For example, first sensor 110 may transmit an RF test signal that may be intercepted by a second sensor, which then may transmit an RF test signal to a third sensor, and so on in around robin fashion. The RF test signal may mimic the characteristics of a typical UAS control signal. The results of the startup and self-calibration routine for each sensor 110 are reported to the processor system 134. In block 320, the processor system 134 determines the configuration of the MEPS network 120, specifically the number of sensors 110 on-line and the corresponding RF coverage provided by the MEPS network 120, considering, for example, the geographical location of each sensor 110, the TRF and associated buffer zone, and the topography enclosed by perimeter 21 (see FIG. 1A). The processor system 134 may compute expected coverage areas for each sensor 110 to ensure the network provides adequate coverage to detect unauthorized UAS in or near the perimeter 21.

In block 325, the processor system 134 determines if RF coverage provided by the network 120 is adequate. In an example, adequacy of coverage is a probabilistic process. In making this probability-based determination, the processor system 134 may use the computed coverage areas for each of the sensors 110 to determine what percentage of the overall area 20 is covered and/or if the coverage areas include the entire perimeter 21 of the area 20. The processor system 134 then may compute an expected probability of detection of an unauthorized UAS given expected UAS controller characteristics and the computed coverage areas determined in block 320. The processor system 134 may account for topography differences, weather differences, and other factors. The processor system 134 may be programmed to report adequate coverage when the probability of detection exceeds a configurable threshold value; for example, a 90 percent probability of detection. If the coverage is not adequate, the method 300 moves to block 330 and the processor system 134 may provide an alert to wildfire suppression personnel with indications of where any additional sensors 110 should be deployed or where existing sensors 110 should be redeployed. Following block 330, the method 300 moves to block 340. If, in block 325, the processor system 134 determines that RF coverage provided by the network 120 is adequate, the method moves to block 340.

In block 340, the MEPS 100 begins or continues passive monitoring of the area encompassed by the perimeter 21, including plotting flight path data for wildfire suppression aircraft. In block 350, the processor system 134 checks the status of the TFR. If the TFR is expected to change, or has changed, the processor system 134 receives a TFR update, and plots the update. In block 360, the processor system 134 determines if the current configuration of the network 120 still is adequate. In performing the determination of block 360, the processor system 134 may perform calculations and execute algorithms that are the same as or similar to those described with respect to blocks 320 and 325. If in block 360, the processor system 134 determines the network configuration still is adequate, the method 300 returns to block 340. If in block 360, the processor system 134 determines the network configuration is not adequate, the method 300 returns to block 330.

Figure 3B:
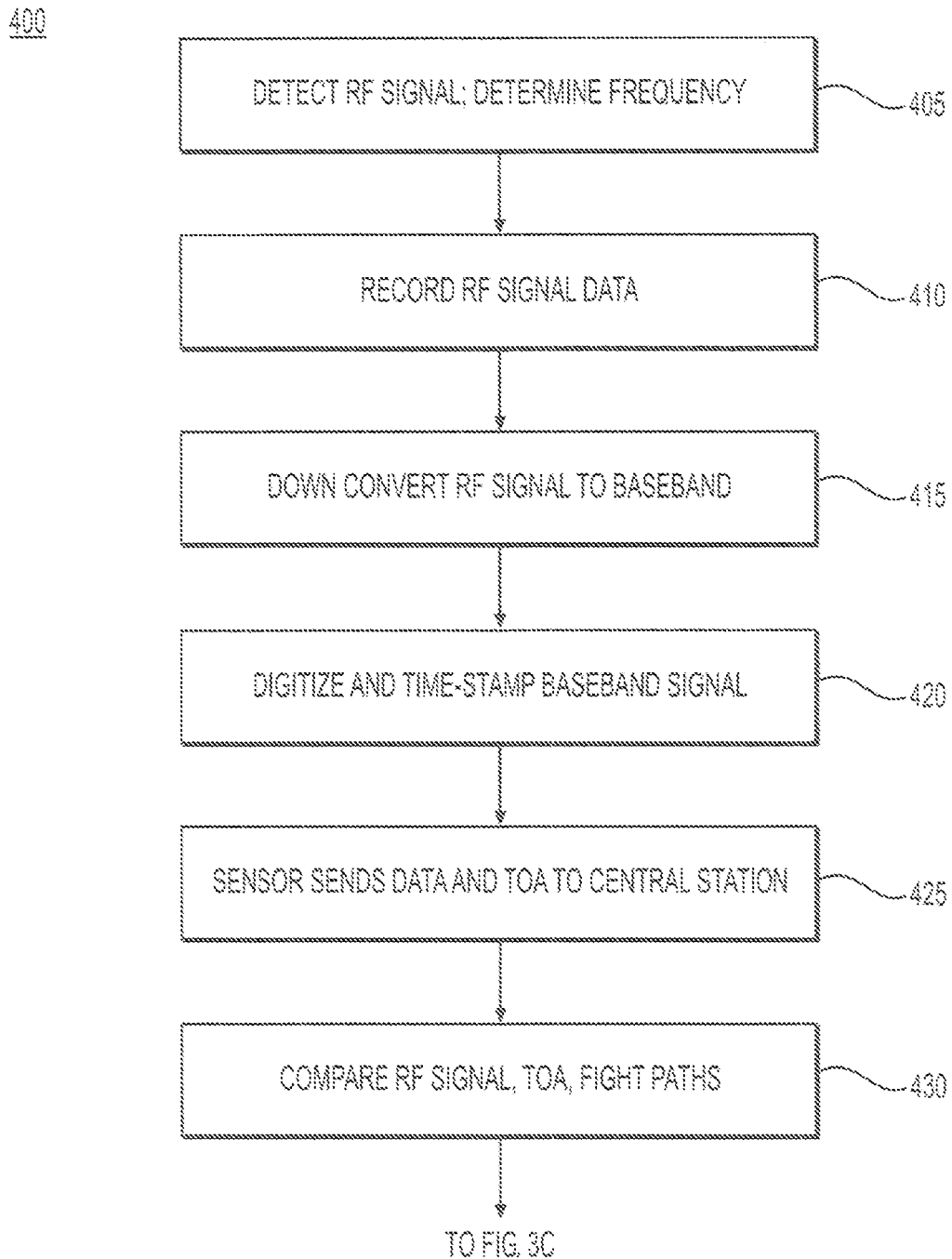
Figure 3C:
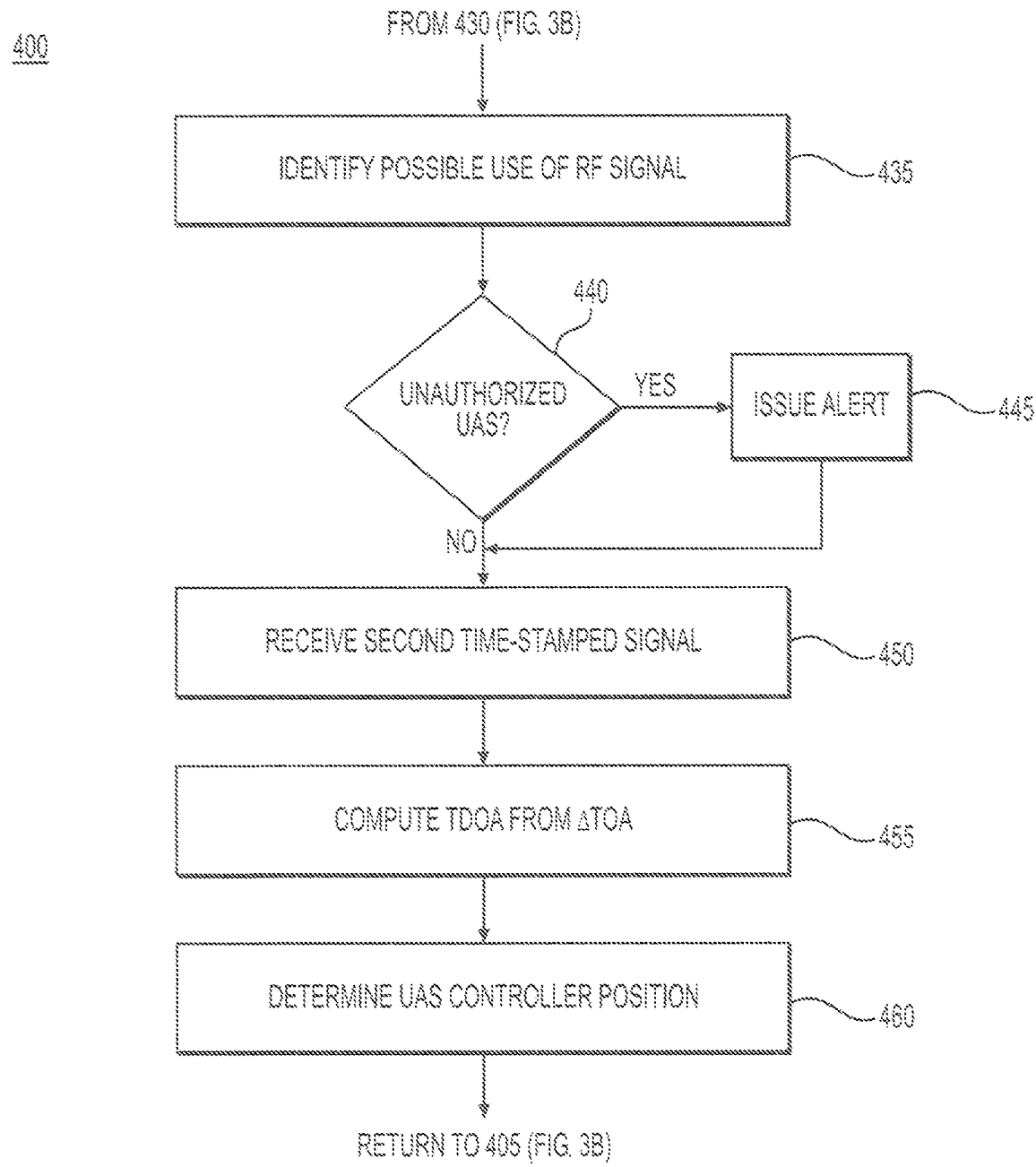

FIGS. 3B and 3C show a flowchart illustrating an example method executed by the MEPS 100 when detecting unauthorized UAS operations in or near a wildfire. In FIG. 3B, method 400 begins or continues in block 405 when first sensor 110 detects an RF signal and determines the frequency of the received RF signal is in the frequency range associated with control of an unauthorized UAS. The determination of block 405 may involve comparing the received frequency to known UAS RF control signals. Alternately, the sensor 110 may include a hardware or a software band bass filter that, for example, passes only RF signals having a frequency that may be used by certain UAS, and hence any received frequency that is passed may be indicative of an RF signal used to control an unauthorized UAS. In block 410, the sensor 110 records RF signal parameters, including received frequency, received power level, and other data. In block 415, the sensor 110 down converts the received RF control signal to an intermediate frequency. In block 420, the sensor 110 digitizes the down-converted RF signal and time-stamps the digitized signal thereby creating TOA data for the RF signal. In block 425, the sensor 110 sends the time-stamped digital signal data to the central processor system 134 over mesh network 120. In block 430, the processor system 134 compares the received RF signal from the first sensor 110 and compares the received data with aircraft flight profile data for any currently flying wildfire suppression aircraft. If the processor system 134 determines fire suppression aircraft are flying, the method 400 moves to block 435 and the processor system 134 determines if the received signal from the first sensor is indicative of an unauthorized UAS—by determining if any authorized UAS are flying, and determining if the frequency matches that normally associated with unauthorized UAS (e.g., 2.4 or 5.8 GHz), for example. In block 440, the processor system 134 determines if the received signal is from an unauthorized UAS' controller, and if the received signal is from an unauthorized UAS' controller, the method 400 moves to block 445 and the processor system 134 issues an aircraft alert indicating an unauthorized UAS may be operating within or near the perimeter 21.

Following block 440 or 445, the method 400 then moves to block 450 and the processor system 134 receives a second time-stamped RF reception signal from a second sensor 110. In block 455, the processor system 134 computes a TDOA based on the first and second time-stamped signals (i.e., the first and second TOA).

As an alternative, certain aspects of the method steps of blocks 450 and 455 may be executed locally at the first or second sensor 110 to compute TDOA from the two received TOA. Following determination of the TDOA, locally at the sensor 110 or remotely at the processor system 134, the processor system 134, in block 460 determines a position estimate for the unauthorized UAS controller using computed TDOA for other sensor pairs. Following block 460, the method 400 returns to block 405.

As disclosed above, the MEPS system 100 includes sensors 110 that may receive an RF signal from a UAS controller and that then provide information related to that received RF signal to central station processor system 134. The central station processor system 134 uses the RF signal information to determine an estimate of the position of the UAS controller using multilateration principles and methods. One such multilateration method relies on a time difference of arrival (TDOA) of the RF signal at pairs of sensors 110.

in an example, the TDOA process employed by the MEPS 100 is based on the concept that a RF signal transmitted by a UAS controller is received by sensors 110 with a small-time delay. The time of transmission is not known, but the times of reception are known, and the difference in times of reception is used to compute the TDOA.

Figure 4A:
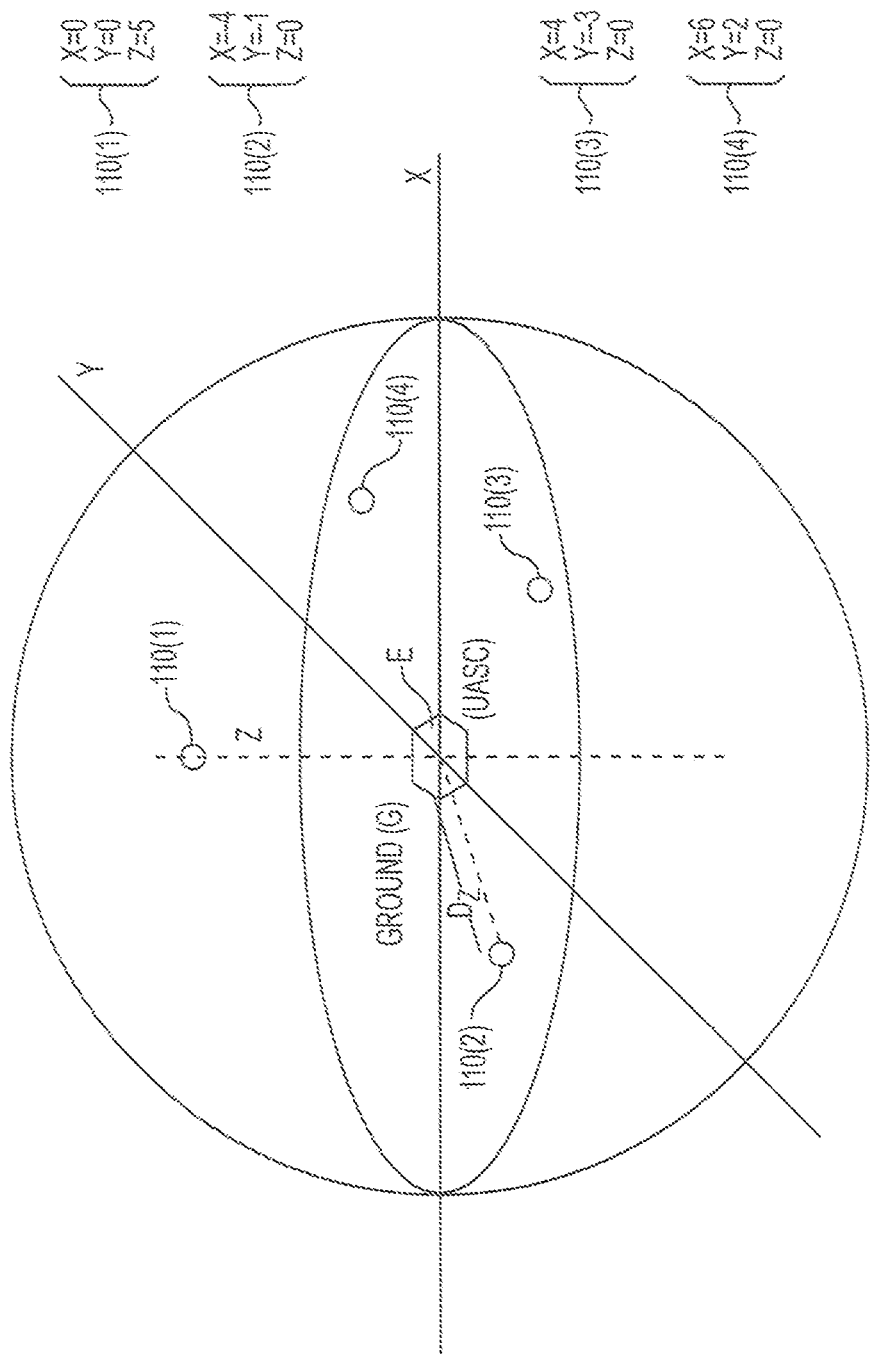
Figure 4B:
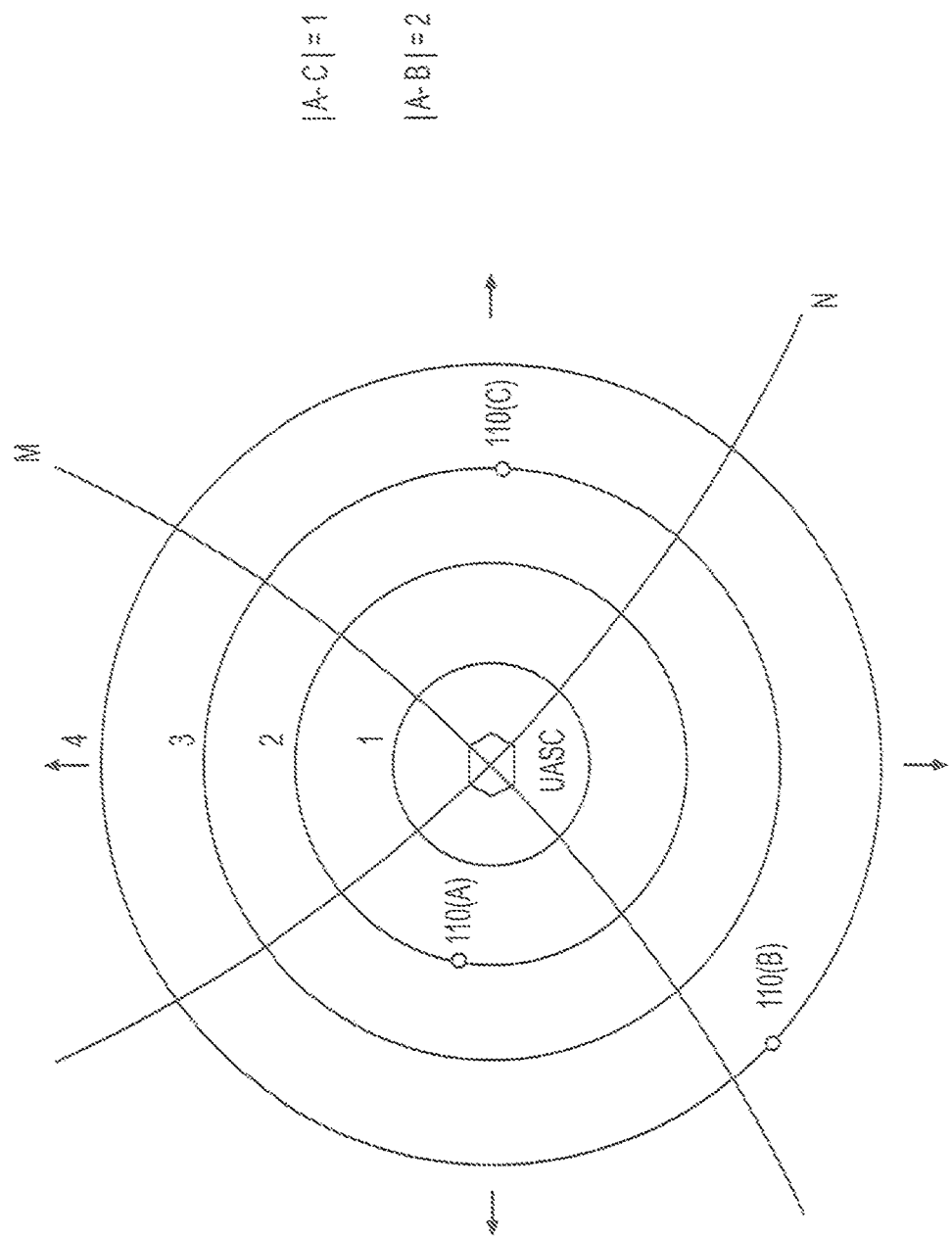

The TDOA measurements between two sensors 110 may be used in a TDOA algorithm to estimate the location of a UAS controller, and the mathematical solution may be expressed or visually rendered as an intersection of three hyperboloids (in 3-D) on which the UAS controller is located. When four or more sensors 110 detect the RF signal from the UAS controller, the processor system 134 can estimate the 3-D position of the UAS controller based on the intersection of these three hyperbolas. If only three sensors 110 detect the RF signal, a 3-D position cannot be estimated directly (since the processor system 134 does not compute three intersecting hyperbolas). However, if the altitude of the UAS controller is known (e.g., from another source) or may be assumed, then the 3-D position of the UAS controller may be estimated. As noted herein, a UAS controller may be at ground level, and hence, for a flat area, the altitude of the UAS controller with respect to each of the RF signal-detecting sensors 110 that also are at ground level can be assumed to be zero, and where the RF signal-detecting sensors 110 are placed in an aircraft or balloon, the altitude difference is or known or knowable. When more than four sensors 110 detect the RF signal, the extra information may be used to either verify the correctness of the UAS controller position estimation or to calculate an average position estimate. FIGS. 4A-4C(5) illustrate, visually, the differences between a three-sensor position estimation and a four or more-sensor position estimation.

FIG. 4A illustrates the general case of determining the location of an RF emitter E (e.g., a UAS controller (UASC)) by intercepting the emitted RF energy at multiple, spatially different receivers R (e.g., the MEPS sensors 110) of known geographic position. As illustrated, emitter E, at position $E=(x, y, z=0)$ (in the Cartesian coordinate system) emits an RF signal at time $t=0$ and the wave front of this RF energy spreads outwardly from the emitter E at the speed of light toward receivers $R_0, R_1, \ldots R_i \ldots R_m, R_n$. In FIG. 4A, receiver $R_0$ corresponds to sensor 110(1) and so on. The wave front may have the form or shape of an expanding hemisphere, assuming the emitter E is an omni-directional emitter and that the emitter E is located on the ground G. The position $P_m$ of receiver $R_m$ is $P_m=(x_m, y_m, z_m)$ and the distance from emitter E to receiver $R_m$ is given by $D_m$=absolute value of $P_m-E=((x_m-x)^2+(y_m-y)^2+(x_m-z)^2)^{1/2}$. Similar calculations provide the distance between the emitter E and all other receivers $R_i$. Since the speed of light is constant, the distance $D_m$ divided by the speed of light provides an accurate measurement of the time between emission and reception. In practice, of course, the x, y, z position of the emitter E is unknown. Assuming the distances from emitter E to each receiver $R_m$ differ, the time of arrival (TOA) at each receiver is different, and this difference can be used to compute the TDOA between two receivers. The TDOA between two receivers does not uniquely locate the emitter E, however. Instead, the TDOA may be used to compute an infinite number of possible positions of the emitter E relative to the two receivers; the positions can be represented visually as a hyperboloid, as noted above. The process may continue by performing another TDOA calculation using a third receiver and either one of the first two receivers to produce a second hyperboloid. The two hyperboloids, when rendered visually, will be seen to intersect (see FIG. 4C(1)-(5)), and the intersection will produce a hyperbola on which will lie the emitter E. Using a fourth receiver, the process may continue to produce a third hyperboloid. The intersection of all three hyperboloids then should produce a 3-D position estimate of the emitter E.

In the example of FIG. 4A, n=4, and receivers $R_1$, $R_2$, and $R_3$ are located "on the ground" (i.e., z=0) while receiver $R_0$ is located at some altitude $z_0$ higher than the altitude of the emitter E, which is at z=0. One advantage of having a receiver $R_i$ located above the plane (i.e., the ground) on which lies the UAS controller is apparent in a hilly topography or a forested area—namely a possible reduction in interference with the UAS control signal. As discussed herein, having a receiver $R_i$ with a different azimuth than the UAS controller also adds to the accuracy of the UAS controller position estimate.

FIG. 4B illustrates a 2-D multilateration scenario in which RF emitter E is at an unknown location relative to RF sensors 110A, 110B, and 110C. At time 0, the RF emitter E sends a burst RF transmission which propagates spherically. The RF signal reaches the sensors 110A-C at different times; the difference in these times is called the time difference of arrival (TDOA). The TDOA is calculated between each RF sensor in a set or pair of RF sensors. Concentric circles are shown for time units 1-4. At time unit 2, the RF signal is detected by RF sensor 110A; at time unit 3, the RF signal is detected by RF sensor 110C; at time unit 4, the RF signal is detected by RF sensor 110B. Assuming RF sensors 110A and 110C form a first sensor pair A-C and sensors 110A and 110B form a second sensor pair A-B, the TDOA for sensor pair A-C is one (1) time unit and the TDOA for sensor pair A-B is two (2) time units. Note that emitter E may be located at any point on curve M (a hyperbola); that is, if emitter E is located on curve M (a hyperbola), the TDOA for sensor pair A-C is one (1) time unit. Similarly, the emitter E may be located at any point on curve N, which shows the TDOA for sensor pair A-B is two (2) time units. Thus, each RF sensor 110A-C corresponds to a focal point for one of the hyperbolas M and N and the constant distance represented by the hyperbolas M and N is derived from the TDOA multiplied by the speed of light. The intersection of hyperbolas M and N is the estimated position of emitter E. The hyperbolas M and N may be updated in real time when new TDOA values are calculated. This generates new hyperbolas M and N and a new estimated position of the emitter E. The processor system 134 of FIG. 2B executes algorithms and steps of multilateration engine 210 that are the mathematical equivalent of the process illustrated graphically in FIG. 4B to estimate the UAS controller position.

If a 3-D solution is required or desired (i.e., the emitter E is thought to be above ground level (for example, the emitter E is or could be located on a hill)), a fourth sensor would be added, and rather than hyperbolas, the display would show three hyperboloids. The intersection of the three hyperboloids then would define the position of the emitter E. This situation is shown graphically in FIG. 4C(1), and emitter E is located at some height z above a zero-level reference plane (i.e., at height z above ground level G). Four RF sensors 110D1-D4 are positioned near the emitter E, and one or more of the sensors 110D1-D4 also may be positioned above ground level. Use of four sensors provides three sensor pairs that may be used to compute three TDOA. Using the three TDOA, the multilateration engine 210 computes possible locations for the emitter E, each computed possible location existing as one hyperboloid of a two-sheeted hyperboloid (note that for a two-sheeted hyperboloid, one of the two hyperboloids has an apex at a −z value—clearly a physically impossible situation although mathematically possible). FIGS. 4C(2)-4C(4) show sections of the resulting three hyperboloids 540, 542, and 544, respectively, for each of the sensor pairs. FIG. 4C(5) shows the three hyperboloids 540, 542, and 544 intersecting each other. The emitter E is located at the common intersection of the three hyperboloids (the intersecting hyperboloids may produce two possible locations, so that additional information may be needed to resolve the ambiguity). The mathematical solution may begin with the equation $$-(x^2/a^2)-(y^2/b^2)+(z^2/c^2)=1, \qquad \text{EQN 1:}$$

where a, b, and c are axis lengths for a hyperboloid and x, y, and z are the coordinates of points that lie on the surface of the hyperboloid. Equation 1 is solved indirectly for each of the three sensor pairs (a total of four sensors 110), and if the results are plotted, three intersecting hyperboloids will be produced. The intersections provide possible approximate locations of the UAS controller. More specifically, for a first sensor pair, a first TDOA is computed. Since the positions of each of the sensors 110 in the first sensor pair are known, a hyperboloid of all possible locations of the UAS controller can be computed given the TDOA between the two sensors 110 of the first sensor pair. The TDOA divided by the speed of light produces a distance that is the difference (distance differential $\Delta d$) in distance $d_1$ from the first sensor 110 to the UAS controller and the distance $d_2$ from the second sensor 110 to the UAS controller. Ignoring aspects of signal propagation, any distance $d_1$ from the first sensor 110 to the UAS controller and any distance $d_2$ from the that satisfies $$|d_1-d_2|=\Delta d=\text{constant} \qquad \text{EQN 2:}$$

will lie on a hyperboloid of solutions to Equation 1. Note that a hyperbola of constant distance differential also may be plotted. See FIG. 4D(1), which shows the locations P1 and P2 of two sensors 110. Hyperbolas Q and R represent a cross section of a hyperboloid of two sheets (FIG. 4D(2)). That is, the hyperbolas Q and R, if rotated, produce the two halves Q' and R' of two-sheeted hyperboloid QR. Position P on hyperbola Q represents one possible location of the UAS controller. As can be seen in FIG. 4D(1), the hyperbola Q represents a set of possible points Pi that represent the location of the UAS controller. Thus, the MEPS 100 finds a set of points in space whose distance difference to two sensors 110 is constant. Furthermore, the sensor 110 at position P1 clearly receives the RF signal before the sensor 110 at P2 receives the same RF signal. Thus, only the half hyperboloid Q' represented by the rotation of hyperbola Q contains possible locations P of the UAS controller.

Figure 4E:
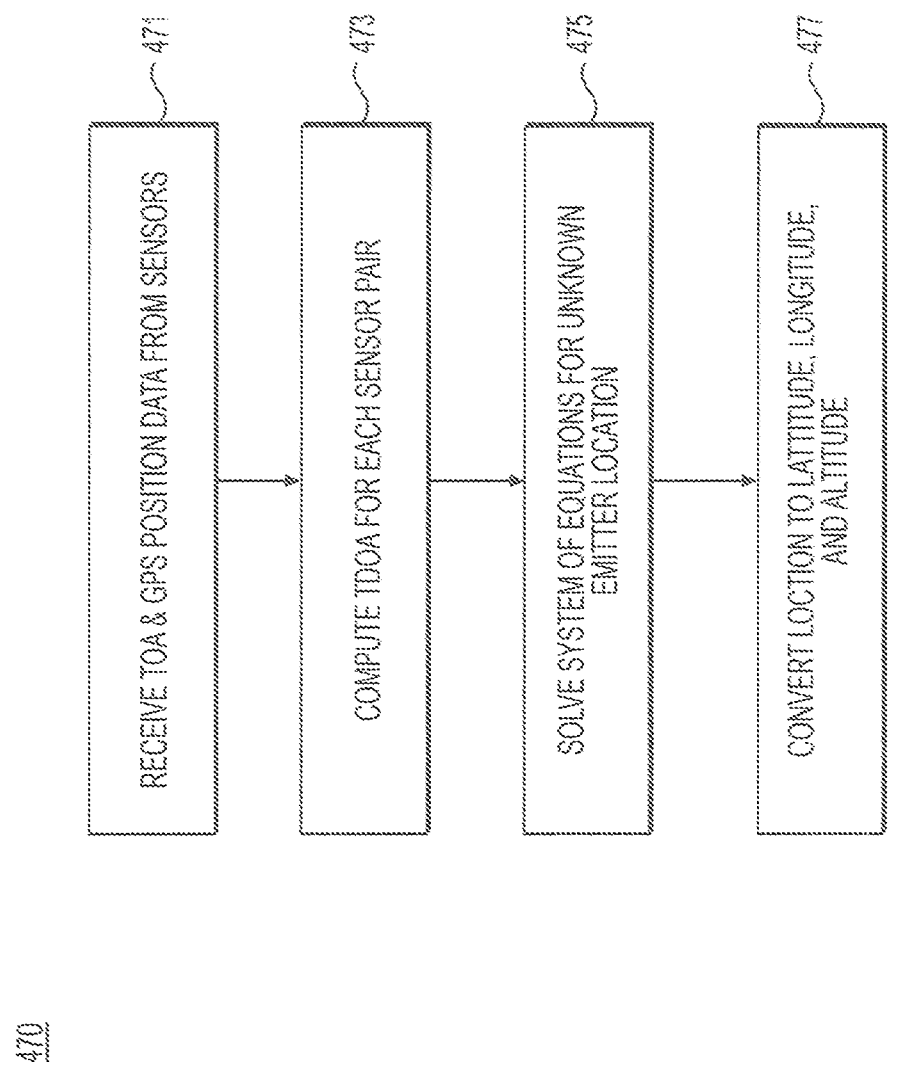
FIG. 4E illustrates an example algorithm that may be executed to provide a location estimate for a UAS controller.

FIG. 4E illustrates an algorithm 470 that may be executed to estimate the 3-D location of a UAS controller based on TDOA values derived from RF signal intercepts by four sensors 110. The algorithm 470 solves a system of three equations in three unknowns. The unknowns are the x, y, and z positions of the UAS controller. Known values in the three equations are the x, y, and z coordinate values of each of sensors 110A, B, C, and D. The x, y, and z coordinate values of the sensors 110 may be provided by a GPS receiver at each of the sensors 110A, B, C, and D. Also known is the TDOA between two sensors 110 in each of three sensor pairs B-A, C-A, and D-A; the TDOA are computed using the TOA data collected for each of the four sensors 110.

Execution of the algorithm 470 begins in block 471 when the processor system 134 receives TOA data and GPS position data for each sensor 110A, B, C, and D. In block 473, the processor system 134 computes TDOA for each sensor pair B-A, C-A, and D-A. In block 475, the processor system 134 solves the following system of equations to determine the x, y, and z position of the UAS controller.

$$TDOA_{B-A} = (1/C)[((x-x_b)^2+(y-y_b)^2+(z-z_b)^2)^{1/2} - ((x-x_a)^2+(y-y_a)^2+(z-z_a)^2)^{1/2}]$$

$$TDOA_{C-A} = (1/C)[((x-x_c)^2+(y-y_c)^2+(z-z_c)^2)^{1/2} - ((x-x_a)^2+(y-y_a)^2+(z-z_a)^2)^{1/2}]$$

$$TDOA_{D-A} = (1/C)[((x-x_d)^2+(y-y_d)^2+(z-z_d)^2)^{1/2} - ((x-x_a)^2+(y-y_a)^2+(z-z_a)^2)^{1/2}],$$

where C is the speed of light and where the only unknowns are x, y, and z. The system of equations may be solved by, for example, numerical methods. Thus, at the completion of block 475, the 3-D position of the UAS controller is known. Note that coordinate systems other than the Cartesian coordinate system could be used. In block 477, the system processor 134 converts the UAS controller x, y, z, position to a latitude, longitude, and azimuth, and provides the location for display on the user interface display 501.

In a wildfire situation, some simplifying assumptions may be used to reduce computational load, and speed the process of determining the emitter location. This reduction in computational load may be particularly useful if some multilateration processing occurs at (battery powered) sensors 110. Specifically, the emitter (i.e., the UAS controller) and all receivers (i.e., MPEP sensors 110) may be assumed to be at the same altitude; that is, z=0 (as in FIG. 4B). This assumption may introduce some error when the wildfire occurs in a hilly or mountainous topography, and/or when one or more receivers is elevated above ground such as with a tethered balloon. However, if the intent is to locate a human UAS operator, great precision (positional accuracy) may not be needed. Furthermore, by assuming z=0, rather than needing four receivers to locate the emitter, only three are required as can be seen in FIG. 4B.

The actual computation of emitter position is subject to additional error sources and may result is an unacceptably large positional uncertainty. These additional error sources include the GPS computation used to fix the position of the MEPS sensors, possible movement of the UAS controller, RF signal interference from competing RF emitters, uncompensated movement of a MEPS sensor (e.g., a tethered balloon may drift), and positional uncertainty of a MEPS sensor carried by an aircraft. Positional accuracy may be improved by using additional MEPS sensors (e.g., more than four) and then executing a least squares algorithm. Positional accuracy may be improved by averaging TDOA-based position estimates over an extended time, assuming the position of the UAS controller is fixed. Positional accuracy also may be improved by using a Kalman filter or similar technique. Finally, positional accuracy may be increased by not allowing the MEPS sensors to be too widely dispersed.

Other factors may affect the operation of the MEPS 100 and the accuracy with which the location of the UAS controller is computed. The sensitivity of the receiver 112 (see FIG. 2B) may be defined as the minimum power level of the RF signal the sensor 110 can detect. Since the power level of the RF signal decreases with the square of the distance from the signal source, sensitivity dictates the detection range of the sensor 110. In addition, accuracy of the TOA determination is a function of signal to noise ratio (SNR), and SNR decreases with increasing range. Clock rate refers to the rate of digitizing a baseband or intermediate frequency signal. The higher the clock rate, the more accurate the TOA determination. Delay refers to the time from signal reception at antenna 119 and digitizing (for example, by A/D converter 116(3) (see FIG. 2B). Group delay refers to the delay from multiple sensors 110 (since the TDOA determination is based on sensor groups or pairs). Group delay affects the accuracy of the TOA determination. Group delay generally is not as severe with a distributed clock architecture as it is with a common clock architecture (see FIGS. 7A-8B). With either architecture, group delay can be measured and the MEPS 100 calibrated to account for its effect. Thus, group delay may be consequential only if the MEPS 100 is not calibrated (or is not calibrated accurately) to account for its effect.

The above-described error sources, as well as other error sources, may be measured upon MEPS initiation, and the effects of the error sources may be, at least in part, minimized. Thus, in an example, the MEPS 100 incorporates an initialization routine upon system start up to measure and account for error sources.

Figure 5:
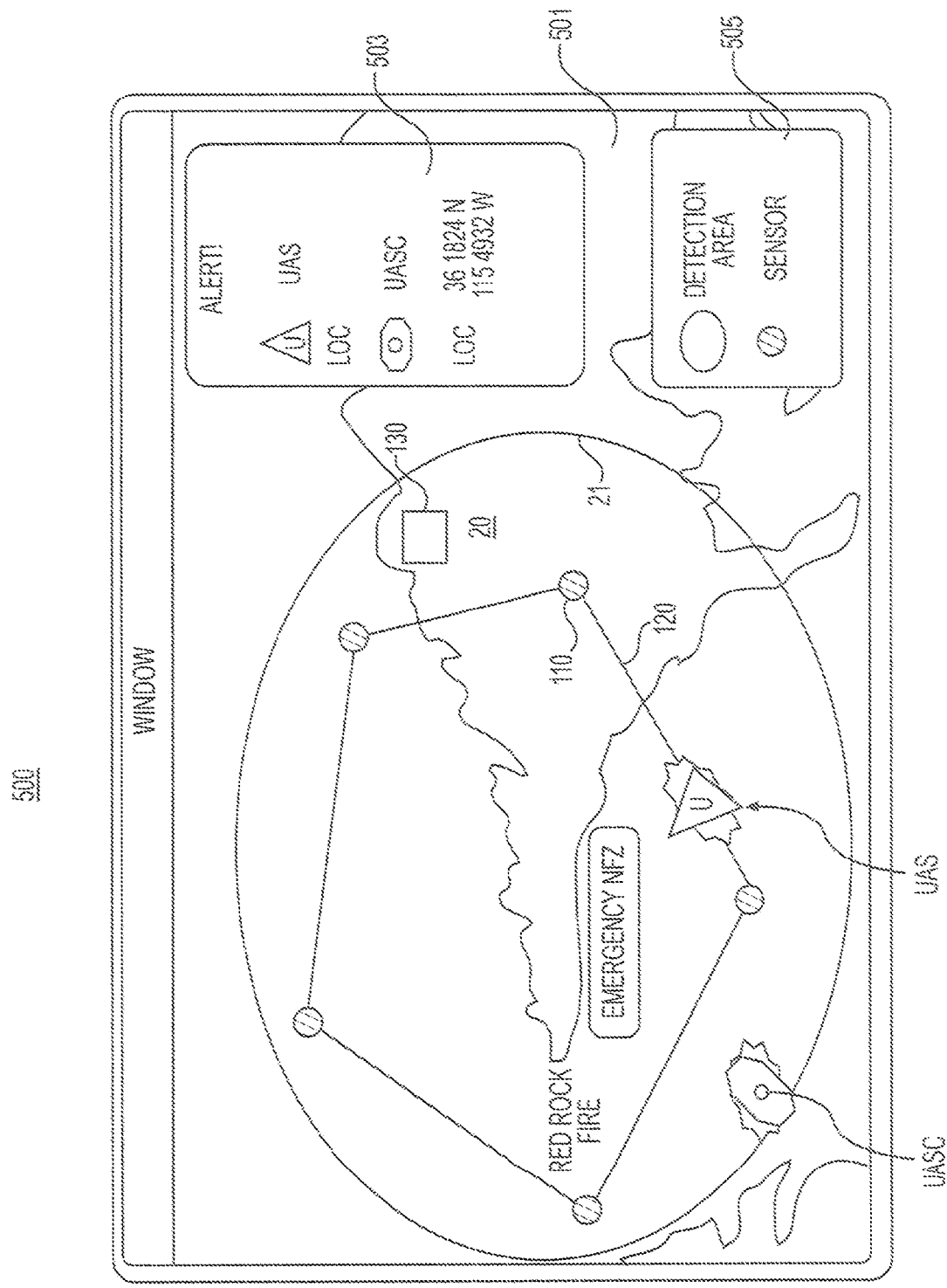
FIG. 5 illustrates an example graphical user interface enabled by the MEPS of FIGS. 2A-2C.

FIG. 5 illustrates an example user interface (U/I) 500 provided through the MEPS 100. The U/I 500 includes a dynamic display 501, which may be shown on a lap top computer or similar device, or on a mobile phone or similar device. The display 501 shows a satellite image of the area surrounding a wildfire. Besides satellite imaging, other means for imaging the wildfire area may be used including aerial reconnaissance. Rather than an image, the display 501 may show a map or computer rendering to the area 20.

Superimposed on the display 501 is a rendering of the mesh network 120 indicating locations of the sensors 110 and the central station 130. For mobile sensors 110, the displayed position may change as the mobile sensor 110 changes position. Also shown on the display 501 is a UAS controller (UASC) and its corresponding UAS, provided the position of the UAS is known or may be estimated. The display 501 may include alert window 503, showing an alert for a detected UAS controller and an information window 505. The display 501 also may display flight paths for wildfire suppression aircraft.

The above description of the MEPS 100 refers to multi-lateration using a time difference of arrival (TDOA) approach. This TDOA approach further is described as based on a time of arrival (TOA) technique. However, other TDOA approaches are possible with the MEPS 100. In another example, rather than, or in addition to, employing TOA-based TDOA, the MEPS 100 may employ a cross-correlation technique to produce the TDOA.

Figure 6A:
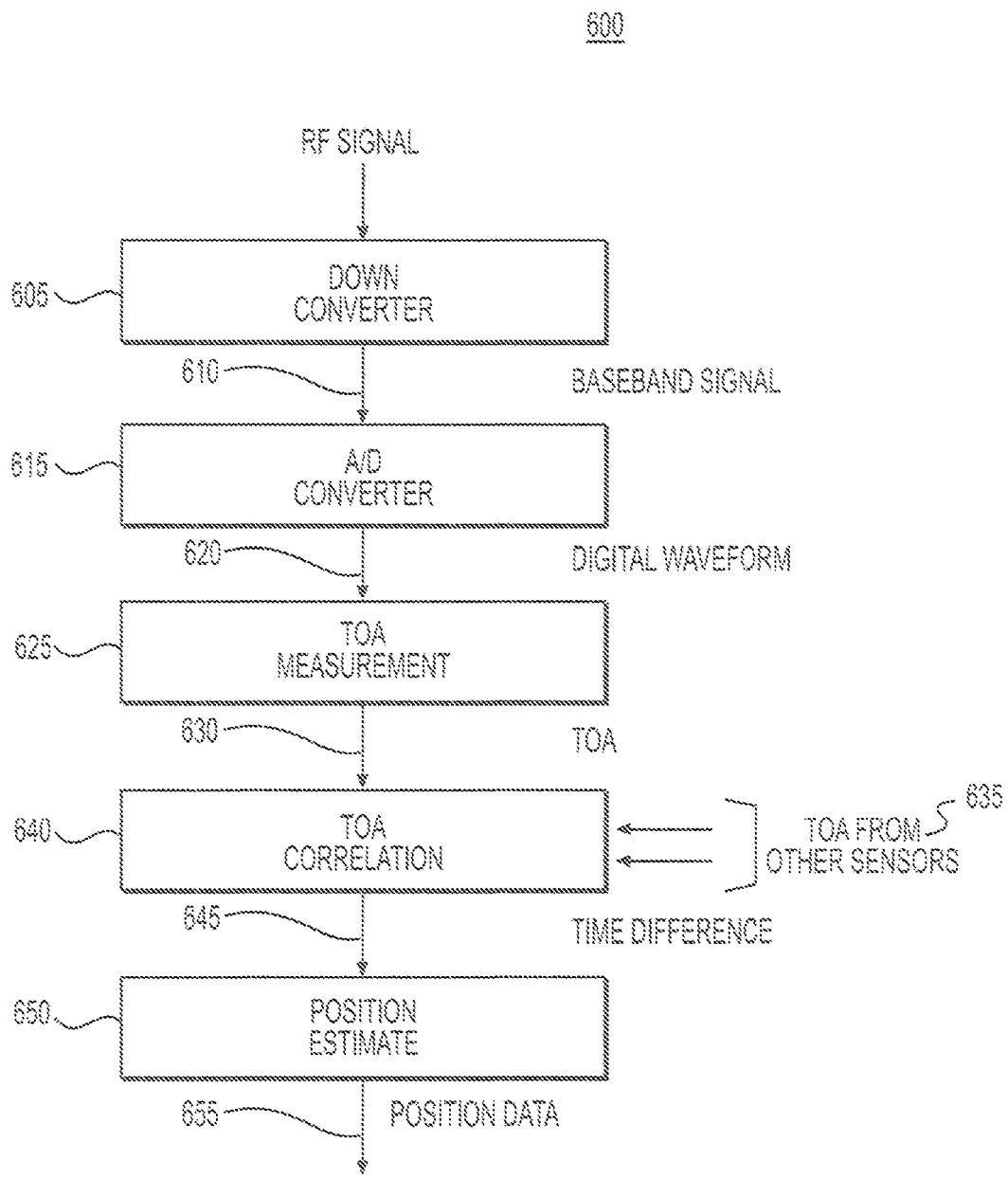
FIG. 6A is a simplified data flow diagram for a time of arrival technique to determine time difference of arrival in the MEPS of FIGS. 2A-2C.

FIG. 6A is a simplified data flow for a TOA-based TDOA system. In FIG. 6A, a TOA-based TDOA data flow 600 begins with reception of a RF signal at antenna 119 of sensor 110. The RF signal then is down converted to a baseband signal 610 at down converter 605 to allow the analog RF signal to be digitized. The baseband signal 610 is digitized in A/D converter 615 to produce digitized waveform 620. Next, the digitized waveform 620 is applied to a TOA measurement process at TOA module 625, producing a measured TOA 630. The measured TOA 630 is the time of arrival of the RF signal at the local sensor 110. Having calculated a series of TOAs 635 for multiple sensors 110, the TOA measurement 630 is correlated with the series of TOAs 635 in TOA correlator 640 to ensure the TDOA calculation proceeds from the same RF signal received at each of the sensors 110. The output of the TOA correlator 640 is a series of time differences 645 for pairs of sensors 110. The time differences 645 are provided to TDOA algorithm module 650 where the TDOA of each pair of sensors 110 is used to compute position data 655 of the UAS controller.

Figure 6B:
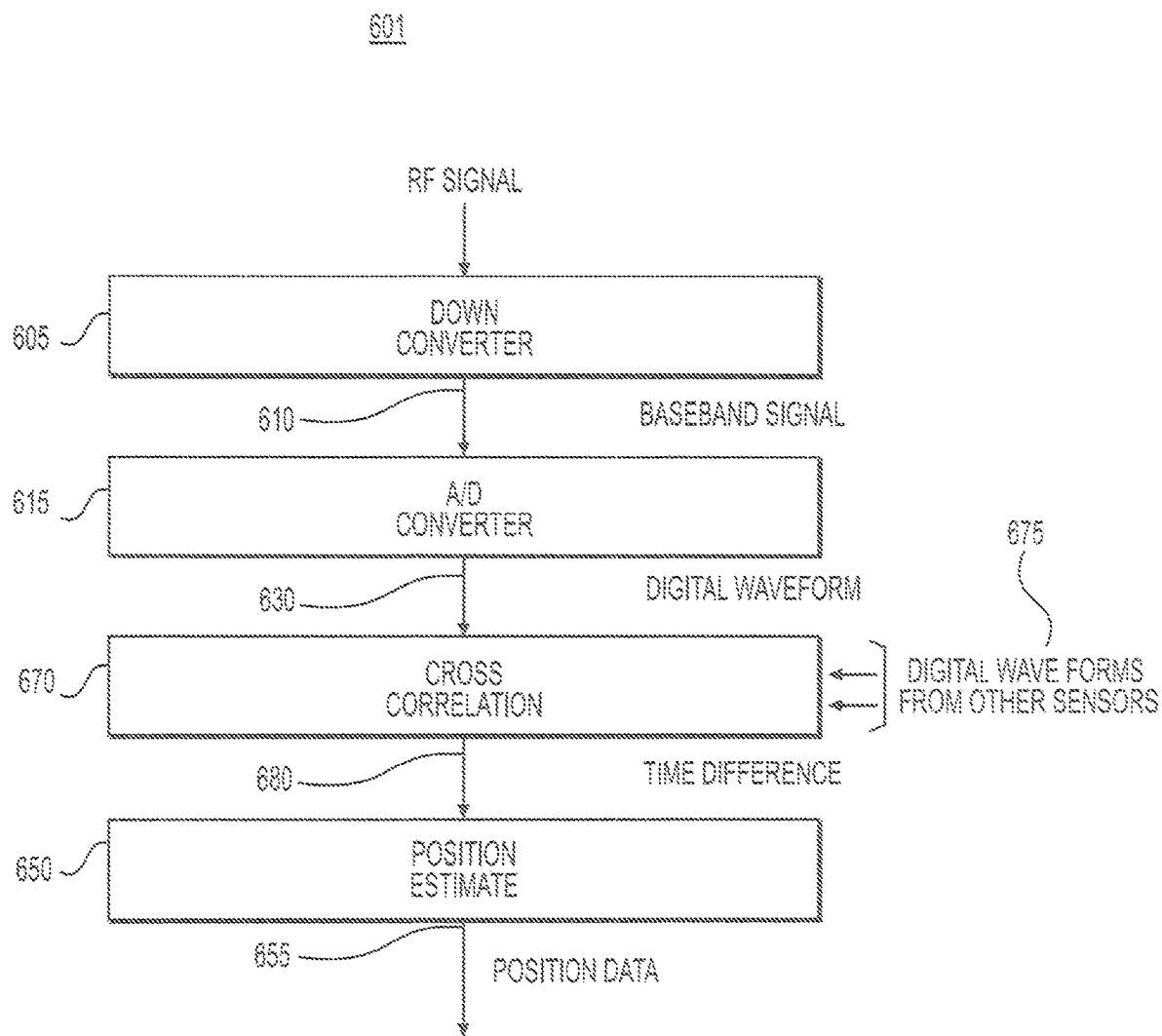
FIG. 6B is a simplified data flow diagram for a cross-correlation technique to determine time difference of arrival in the MEPS of FIGS. 2A-2C.

Rather than computing TDOA based on TOA of a RF signal, an example of the MEPS 100 may use a cross-correlation technique in which TOA data are not needed or used. FIG. 6B illustrates a data flow corresponding to a cross-correlation technique for TDOA determination. In FIG. 6B, data flow 601 begins with receipt of an RF signal at antenna 119, followed by down conversion to a baseband signal 610 at down converter 605. The baseband signal 610 then is digitized in A/D converter 615 to produce digitized waveform 620. Next, the digitized waveform 620 is applied to a cross-correlation module 670, which also receives digitized waveforms 675 from other sensors 110.

The cross-correlation module 670 performs a series of cross correlations on the received RF signal and/or digitized data for pairs of sensors 110. One cross correlation method may compare signal data for signals received at each of two sensors 110 to identify the two received signals as corresponding to the RF signal transmitted from the UAS controller. The method then determines a TDOA by the time difference for one or more data. If the signal from two sensors 110 of a pair of sensors 110 correlates, the cross-correlation process results in a time difference signal 680. The time difference signal 680 is applied to TDOA algorithm module 650 where the TDOA of each pair of sensors 110 is used to compute the location estimate of the UAS controller.

Figure 6C:
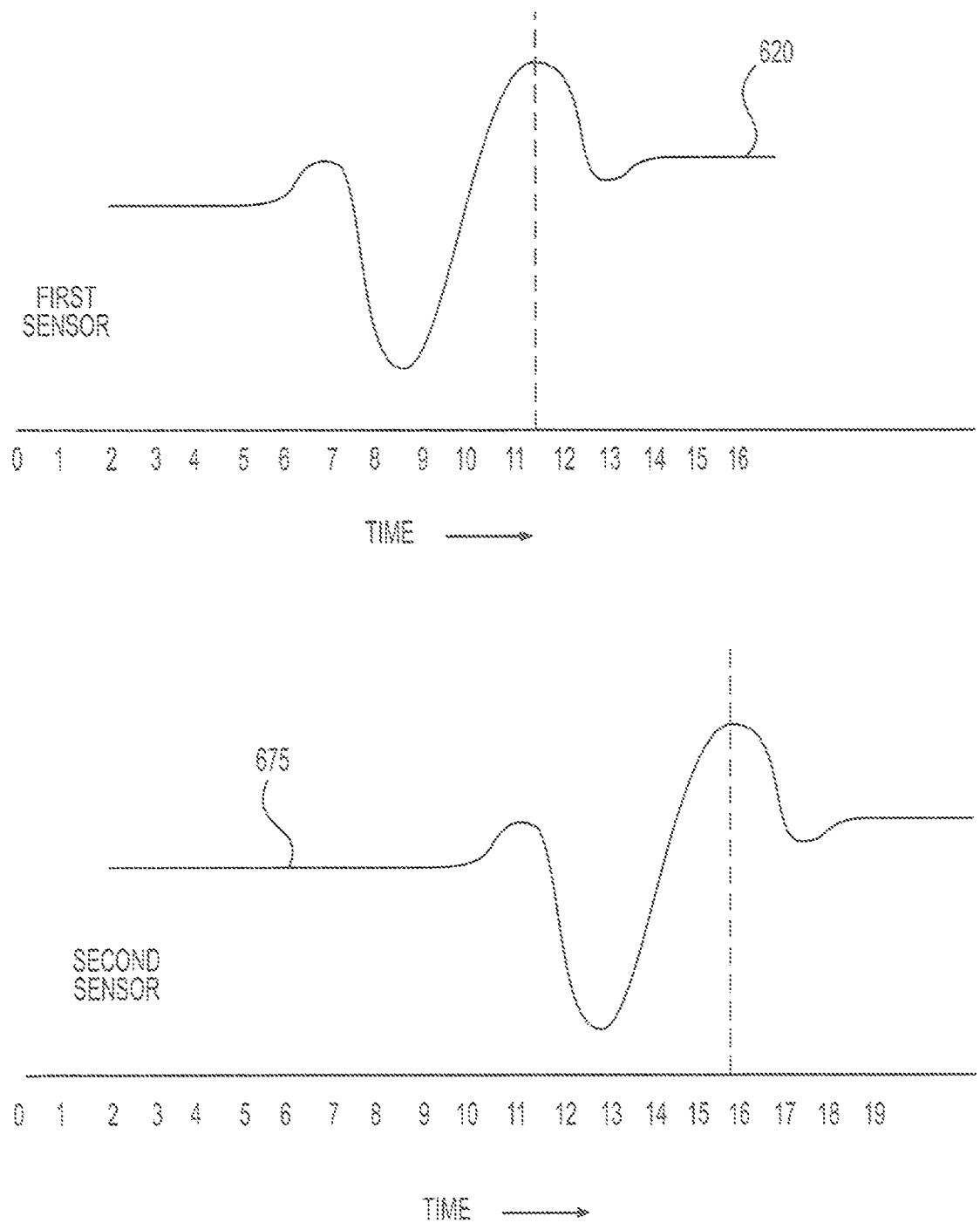
FIG. 6C illustrates a cross-correlation data comparison to determine a time difference of arrival in the MEPs of FIGS. 2A-2C.

FIG. 6C illustrates an example of a cross-correlation used to derive TDOA. In FIG. 6C, waveform 620, representing a RF signal received at a first sensor 110, is compared to waveform 675, representing the RF signal at a second sensor 110 to generate a time difference between receipt of the RF signal at the first and second sensors. In the example shown, a time difference of four time units exists in certain characteristics of the RF signal; the time difference is the TDOA. The thus-determined TDOA may be used by the processor system 134 to estimate the position of the emitting UAS controller.

Certain of the elements shown in FIGS. 6A and 6B may exist at the sensor 110 while other elements may exist at the central station 130. As is described with respect to FIGS. 7A and 7B, the choice of location of the elements shown in FIGS. 6A and 6B may depend on the design objectives of a particular example of the MEPS 100. For example, in one example of the MEPS, the antenna 119 and down converter 605 are located at the sensor 110 and the remaining elements are located at the central station 130. In another example, in addition to the antenna 119 and down converter 605, the sensor 110 includes enough processing elements to determine at least TDOA and possibly to estimate the position of the UAS controller.

Figure 7A:
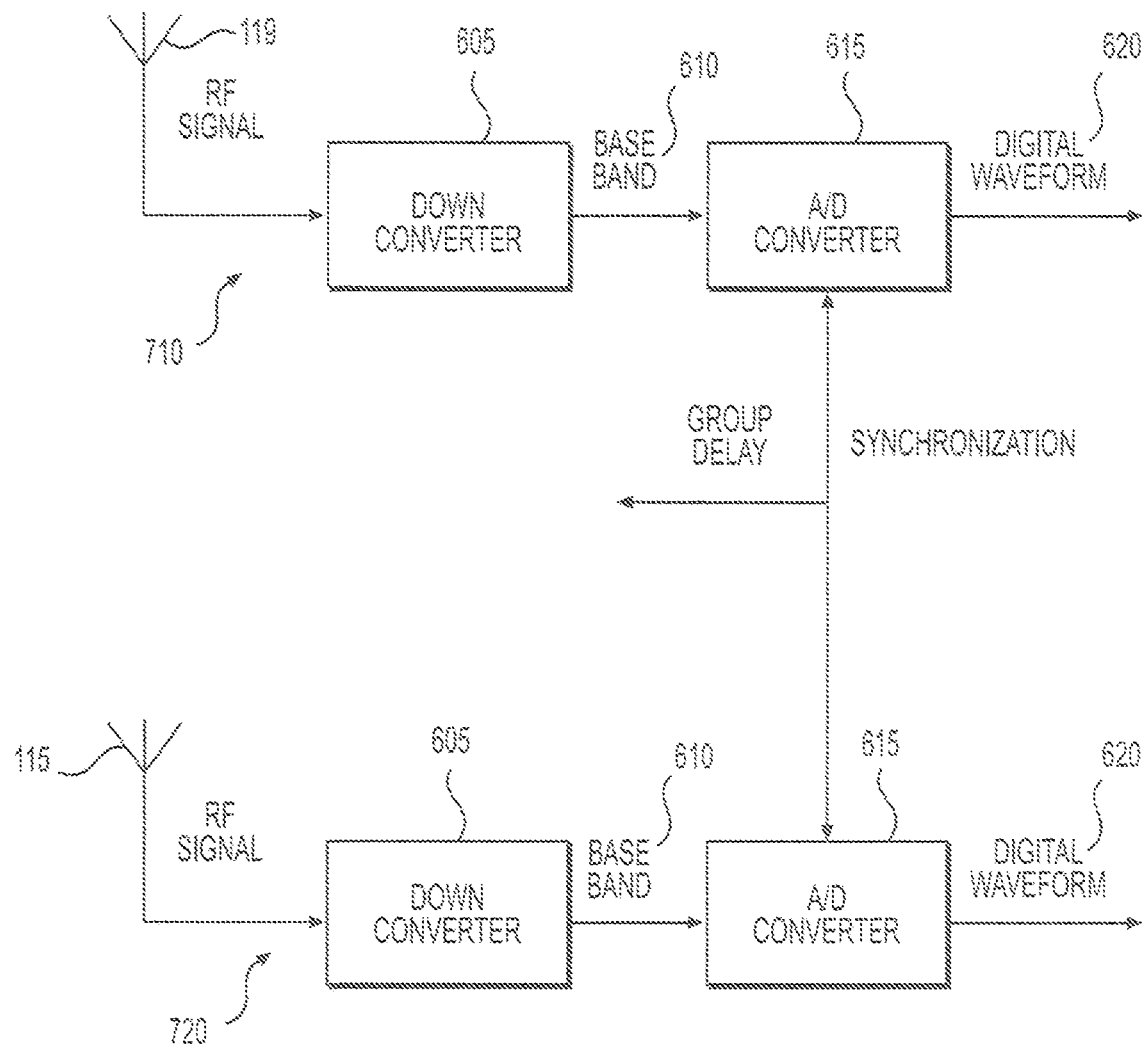
FIGS. 7A and 7B illustrate example architectures for synchronizing signals produced in the MEPS of FIGS. 2A-2C.

Fundamental to both the TOA and cross-correlation techniques disclosed with respect to FIGS. 6A and 6B, respectively, is the concept of synchronization; however, the synchronization method differs between the two techniques. FIG. 7A is a simplified illustration of data flow and components used by the MEPS 100 for an example synchronization process. FIG. 7A shows two sensor chains, 710 and 720, one for each of two sensors 110(1) and 110(2) and their corresponding group time delay. To calculate the position of a UAS controller, the processor system 134 must have the time difference (i.e., the TDOA) from a RF signal arriving at a first sensor 110(1) and the same signal arriving at a second sensor 110(2). However, the signal traversing the processing elements in FIGS. 6A and 6B is time-stamped at the A/D converter 615 (i.e., during the signal digitization process). The digitization process is delayed in time relative to the time of arrival at the antenna 119 by the group delay of the down conversion process executed using the down converter 605. Therefore, to accurately calculate the TDOA, the group delay due to down conversion must be exactly known and compensated. Additionally, the digitization process for each sensor must reference a common time base; otherwise the signals at different sensors 110 will not be directly comparable.

Figure 7B:
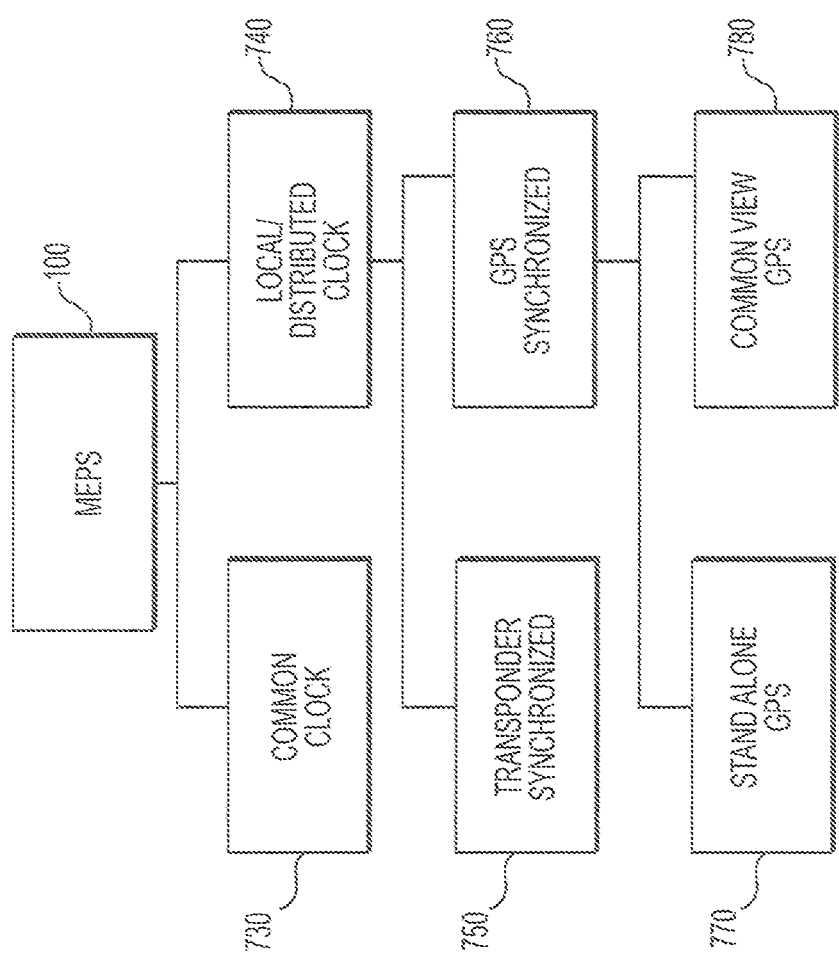

As might be expected, the group delay affects both TOA and cross-correlation TDOA techniques. FIG. 7B shows synchronization architectures that may be used with the MEPS 100. The architectures begin with selection and implementation of a clock system (i.e., a common clock system 730 or a distributed clock system 740).

Figure 8A:
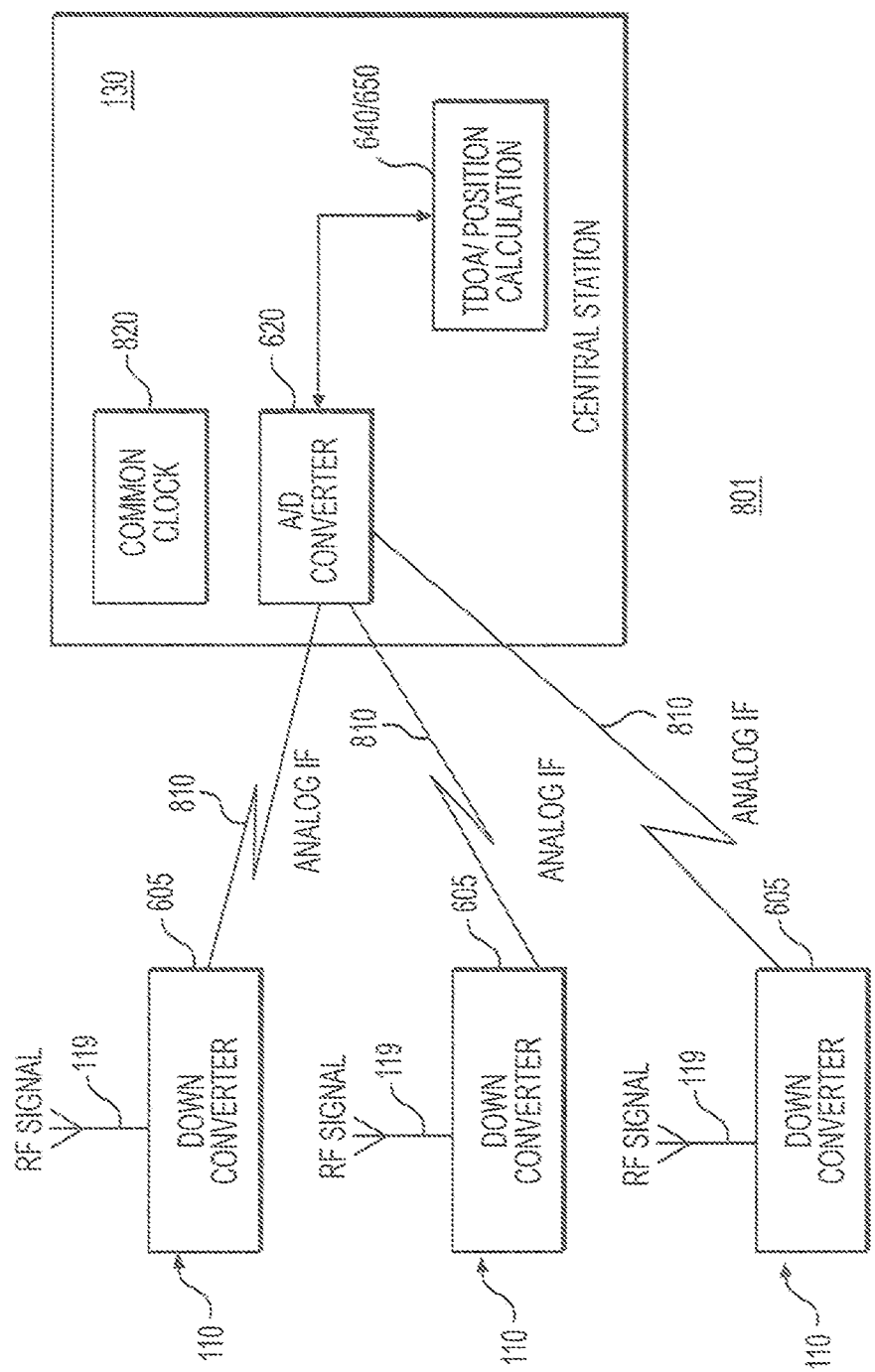
FIGS. 8A and 8B illustrate example clock architectures implemented in the MEPS of FIGS. 2A-2C.

When using a common clock system 730, the MEPS 100 may employ a simpler sensor than is possible with a distributed clock system 740. Referring to FIG. 8A, with a common clock system 730, the sensors 110 receive RF signals from the UAS controller and down convert the received RF to some intermediate frequency. Each sensor 110 then sends the down converted signal to the central station 130 over an analog link. Subsequent digitization and time-stamping using the common clock signal is completed by the processor system 134. With this architecture, there is no need to synchronize the sensors 110 with each other because the processor system 134 performs the digitization. However, group delay between signal reception at the antenna 119 and digitization at the central station 130 may be large because of delays in the analog link, which must be known accurately for each sensor 110. This means both the sensor 110 and the analog link must be calibrated to accurately measure group delay. Delay in the analog link may increase as the length (transmission distance) of the analog link increases. Despite the disadvantages of an analog link with its large group delay, an architecture such as shown in FIG. 8A has the advantage of simple, low cost sensors. The signal delay between the antenna 119 and the processor system 134 puts stringent requirements on the type and range of the analog link, which, in an example could include a microwave link. The location of the processor system 134 typically would be in the center of the deployed sensors to minimize communication link distances. Such a configuration may not be ideal or even workable in a wildfire scenario or any scenario where the boundaries may change unexpectedly.

Figure 8B:
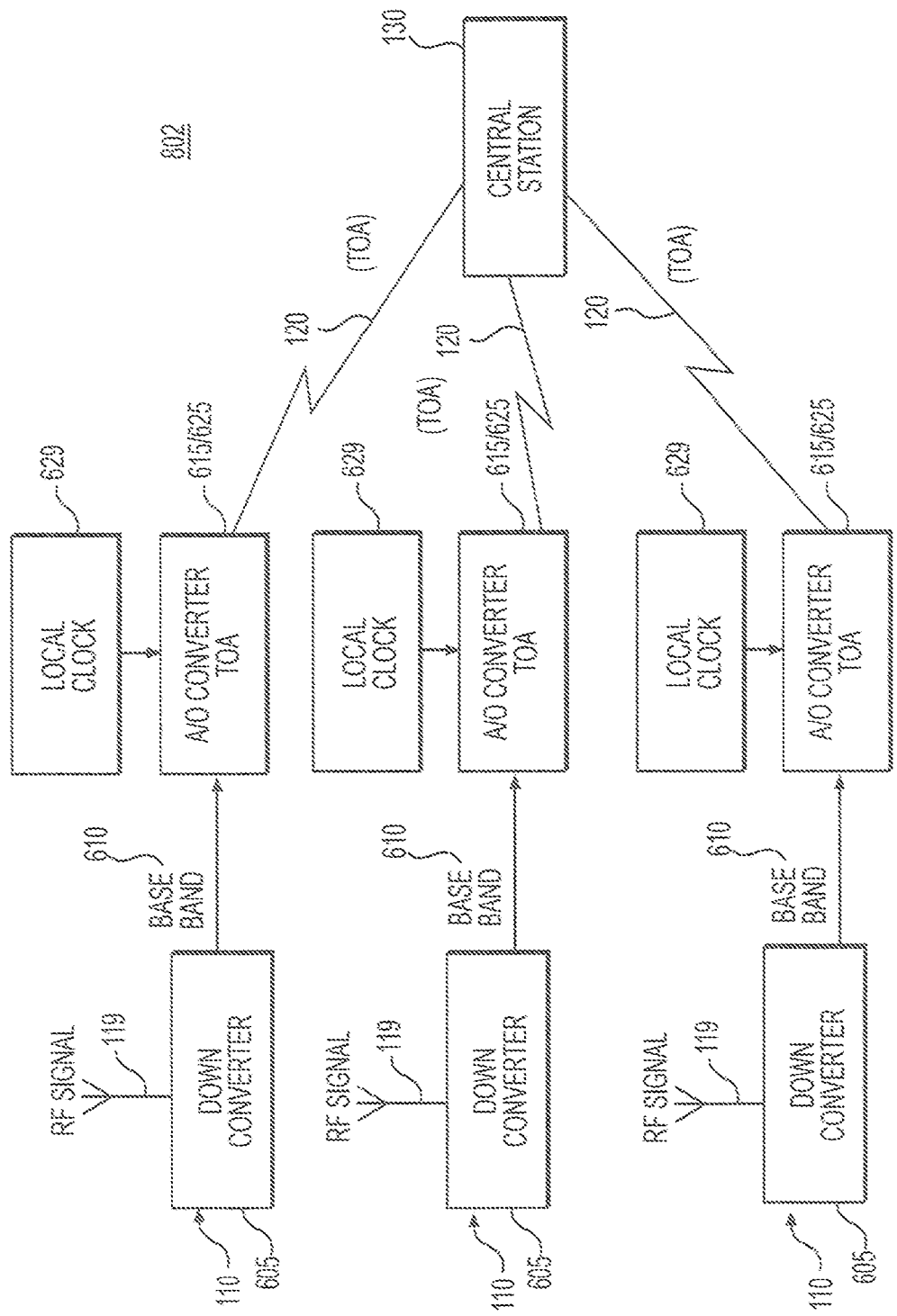

FIG. 8B illustrates aspects of a MEPS that incorporates distributed clocks. Use of distributed clocks increases the complexity of the sensors 110, but the distributed clock architecture reduces demand on the data link compared to that with a common clock system. With the MEPS of FIG. 8B, the RF signal is down converted to baseband, and then digitization and TOA measurement (if applicable) are performed by a processing component at the sensor 110. This sensor-centric processing means only the TOA for each sensor 110 need be transmitted to the processor system 134. Any form of digital data link may be used and link latency is not critical. As noted herein, the MEPS 100 uses wireless mesh network 120, which is compatible with a distributed clock architecture. However, the processor system 134 at the central station 130 then may need to execute a routine to synchronize the clocks at the sensors 110.

Central-station synchronization of the sensor clocks may be accomplished in more than one way using more than one architecture. Referring to FIG. 7B, possible synchronization architectures to be used with a distributed clock system include a transponder synchronized architecture and a GPS synchronized architecture. The GPS-synchronized architecture may employ a standalone GPS architecture or a common view GPS architecture.

Figure 9A:
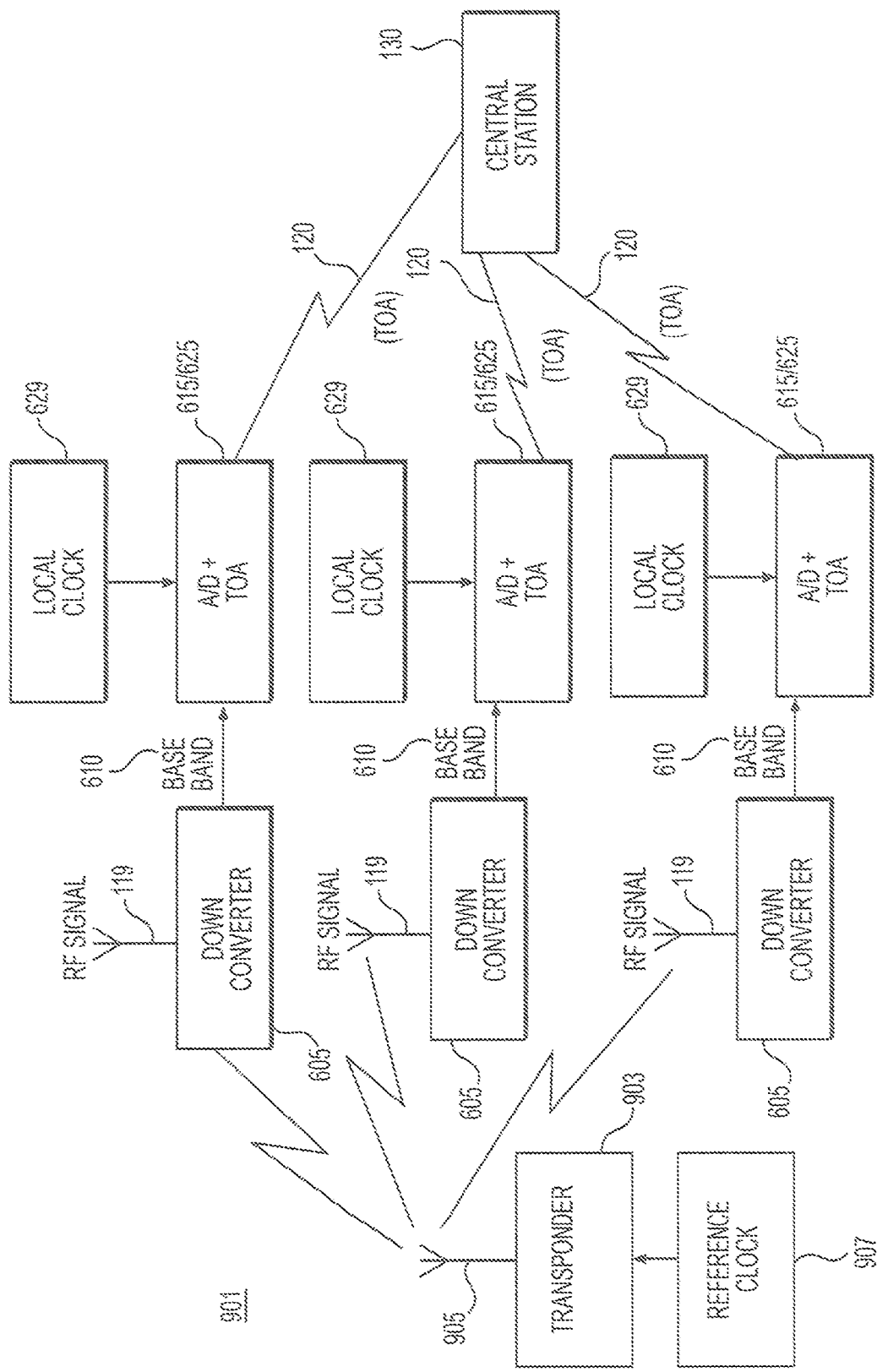
FIGS. 9A-9C illustrate example synchronization architectures for use in the MEPS of FIGS. 2A-2C.

FIG. 9A illustrates a transponder-synchronized architecture 901, which incorporates a reference transponder 903, transmit/receive antenna 905 and reference clock 907 in addition to sensors 110, each of which includes antenna 119, down converter 605, A/D converter 620, and local clock 629. The sensors 110 communicate over wireless mesh network 120 with central station 130 and specifically processor system 134, which computes TDOA from TOAs produced by the sensors 110. The reference transponder 903 provides a reference timing signal to each of the sensors 110 over a wireless link, which may be part of the wireless mesh network 120. The reference timing signal and the analog RF signal from the UAS controller may pass through the same analog receive chain (i.e., the antenna 119 and RF receiver 112 of each sensor 110, and hence any common delays cancel out the delay bias caused by these analog components of the sensors 110. The reference transponder 903 need not be located at the central station 130 but the reference transponder 903 must have line of sight access to each of the sensors 110. This line of sight requirement may mean that the reference transponder 903 and its associated components should be located on a mast or tower, or in some way be elevated sufficiently such that all sensors 110 are in line of sight of the transponder 903.

Figure 9B:
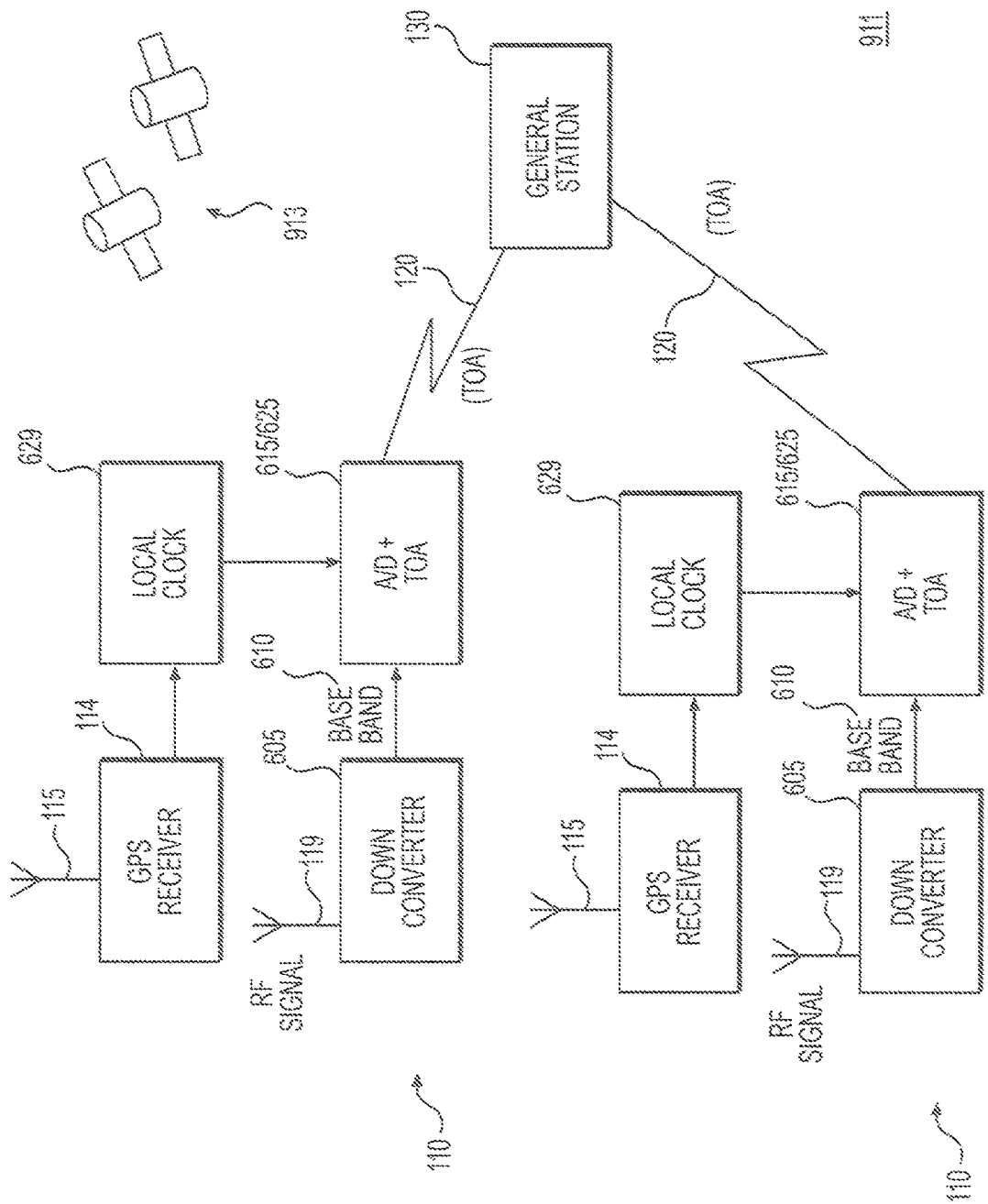

FIG. 9B illustrates a standalone GPS synchronized architecture 911, which includes a GPS system with multiple satellites 913. The GPS system provides an accurate reference clock signal (not shown) that is received at antenna 115 and routed to GPS receiver 114, which supplies a reference time signal to local clock 629, which in turn is used by A/D converter 620 to time-stamp a digitized signal for transmission to central station 130. The timing of a GPS reference clock signal may be accurate to within a few nanoseconds of UTC. This accuracy means the GPS reference clock signal may be used as a common reference to synchronize the sensors 110. Since the MEPS 100 only needs time difference, as opposed to absolute time, use of GPS timing may synchronize sensors 110 to within a few nanoseconds. The GPS standalone architecture does not need towers for line of sight, and the mesh network 120 is effective for data transmission.

Figure 9C:
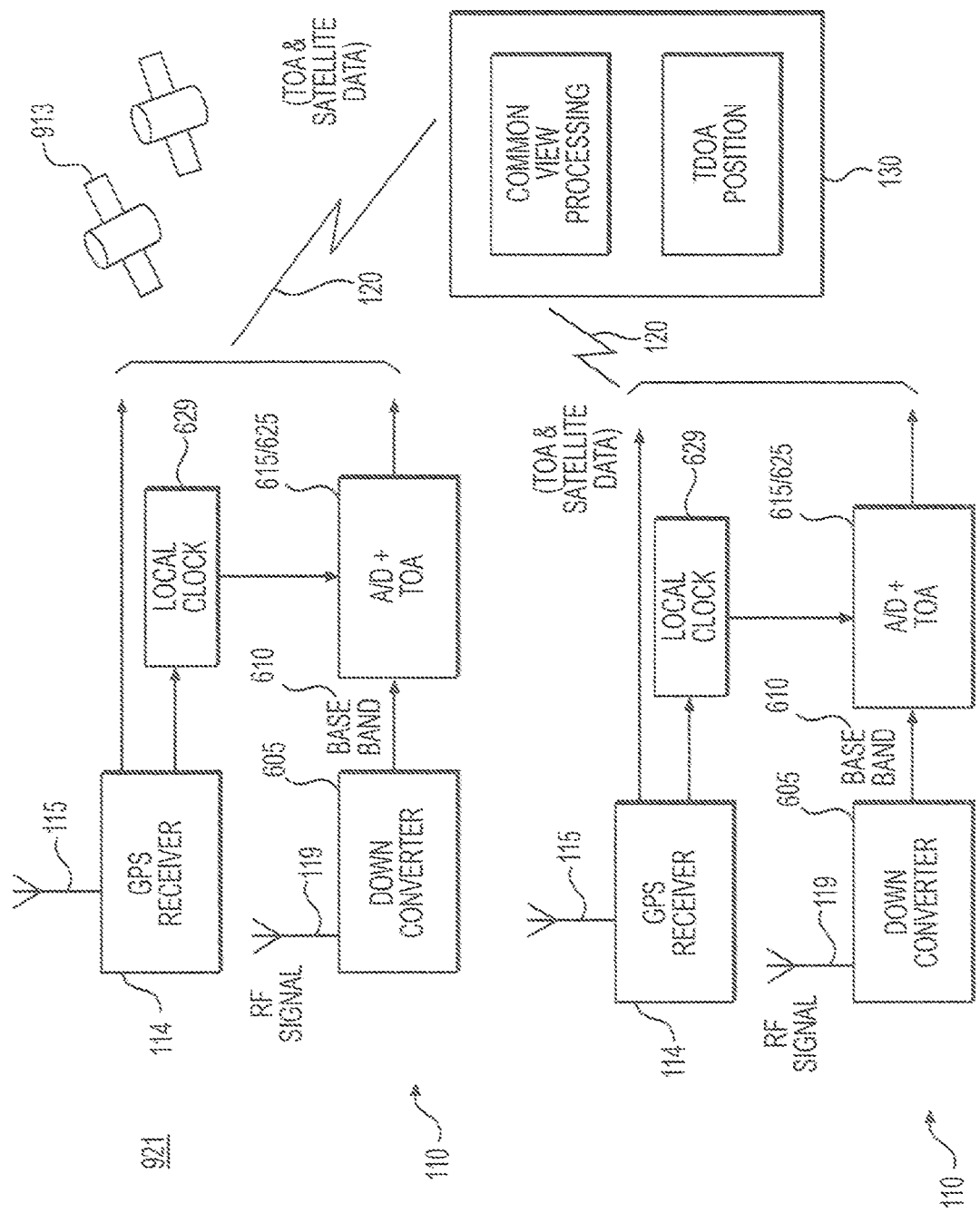

In some situations, a standalone GPS synchronized architecture will not provide the desired accuracy. In these situations, a "common-view" GPS-based timing reference may be implemented. FIG. 9C illustrates common view GPS synchronized architecture 921. The architecture 921 uses only satellites 913 that are in view of all sensors 110. This architecture removes error sources that are common between signals, which in turn may produce the desired accuracy. The calculated synchronization data may be applied directly to the TOA data at each sensor 110 (i.e., at A/D & TOA modules 615/625) or to the TOA data upon its arrival at the centrals station 130. In either case, a GPS receiver is not required at the central station 130.

Considering the options presented in FIG. 7A, one example of a MEPS (see FIG. 9B) may use at least a standalone GPS-based synchronization architecture to synchronize local clocks at each of the sensors 110. The example relies on time-stamping the digitized RF signal, and subsequent transmission of the time-stamped signal to the central station 130 for TDOA computation and estimation of the UAS controller location.

Another example of a MEPS may be similar to the MEPS that is shown in FIG. 9B except that common view GPS synchronization is used. In an aspect, time-stamping occurs at each sensor 110. In another aspect, time-stamping occurs at the central station 130. In yet another example of a MEPS, rather than using TOA to determine TDOA, the MEPS uses cross-correlation to determine TDOA. Other combinations of architectures and processing are possible.

As noted with respect to FIGS. 4A-4E, having one or more sensors 110 located at an altitude sufficiently different than the possible altitude of the UAS controller may improve the accuracy of the location estimate. Furthermore, in some topographies, having one or more sensors at altitude may be necessary to obtain line of sight between at least four sensors 110 and the UAS controller. Options for achieving this altitude differential include placement of sensor components in an aircraft, including a UAS, and placement of sensor components with a tethered balloon. Use of an aircraft, including a UAS has the obvious problem of time on station limitations. In addition, a UAS requires some form of RF control, which could interfere with operation of the MEPS 100. The interference problem may be solved or mitigated by using a different frequency range than that controlling an unauthorized UAS. Use of a tethered balloon may pose a hazard to wildfire suppression aircraft. This hazard may be addressed by accurate plotting of sensor locations and aircraft flight paths.

Any example of the MEPS (e.g., the MEPS 100) may employ sensors 110 that are mobile in that one or more of the sensors 110 may be in continuous or nearly continuous motion during operation of the MEPS. When a moving sensor 110 is employed in an example of the MEPS, a TDOA calculation for a fixed sensor 110 and a moving sensor 110 may be completed by assuming for the instant in time that a RF signal is received, the moving sensor 110 is stationary. This assumption may be particularly relevant when the sensor 110 is mated to a slowly moving UAS. In an example in which a moving sensor 110 is employed, the MEPS 100 may use the algorithm 470 of FIG. 4D. To compensate for movement of a sensor 110, moving sensors may record and report their x, y, z position at the time the received RF signal is digitized and time-stamped. To facilitate use of moving sensors 110, the sensors 110 may use a distributed clock architecture, with the clock receiving timing signals from a GPS satellite.

Certain of the devices shown in the Figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database using known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flowchart and accompanying description to illustrate the examples represented in FIGS. 3A-3C, 6A, and 6B. The disclosed devices, components, and systems contemplate using or implementing any suitable technique for performing the steps illustrated. Thus, FIGS. 3A-3C, 6A, and 6B are for illustration purposes only and the described or similar steps may be performed at any appropriate time, including concurrently, individually, or in combination. In addition, many of the steps in the flowchart may take place simultaneously and/or in different orders than as shown and described. Moreover, the disclosed systems may use processes and methods with additional, fewer, and/or different steps.

Examples disclosed herein can be implemented in digital electronic circuitry, or in computer software, firmware, or hardware, including the herein disclosed structures and their equivalents. Some examples can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A method for establishing and controlling a mobile perimeter at a fixed or moving geographic location and for determining a geographic location of an emitting radio frequency (RF) emitter in a vicinity of the mobile perimeter, comprising:

at a central station, a processor:
receiving intercepted RF data and RF sensor location data from two or more of a plurality of RF sensors in the vicinity of the mobile perimeter, the intercepted RF data comprising a time of arrival and a frequency, two of the RF sensors comprising a pair of RF sensors;
executing a routine to compare a frequency of a received RF signal to known unmanned aerial system (UAS)
the processor executing a cross-correlation process to:
compare characteristics of intercepted RF data from one or more pairs of RF sensors,
based on compared characteristics, determine a time difference of arrival (TDOA) between RF transmissions received at each RF sensor of a first pair of RF sensors, and
repeat the cross-correlation process for each additional pair of RF sensors from which RF signal data are received;
using TDOA values for two or more pairs of RF sensors, the processor computing a location estimate for the RF emitter; and
issuing an alert based on the processor executing a routine to:
compare the characteristics of the intercepted data from the RF sensors with aircraft flight profile data for currently flying aircraft in the vicinity of the mobile perimeter; and
determine the intercepted data from the RF sensors is from an unauthorized RF emitter.

2. The method of claim 1, comprising establishing the central station at one of the plurality of RF sensors.

3. The method of claim 1, wherein the received RF data are down converted at each of the plurality of RF sensors to an intermediate frequency, and the received RF data are received over an analog link to the central station.

4. The method of claim 3, comprising:
the processor generating digital waveforms from the received RF data; and
comparing characteristics comprises comparing characteristics exhibited by multiple digital waveforms.

5. The method of claim 3, comprising synchronizing the cross-correlation process using a common clock signal from the processor to each of the RF sensors.

6. The method of claim 1, wherein each received RF transmission comprises digitized RF data.

7. The method of claim 6, comprising synchronizing the cross-correlation process using a distributed clock.

8. The method of claim 1, wherein the plurality of RF sensors comprise four or more RF sensors, and wherein the location estimate for the RF emitter is a 3-dimensional (3-D) location estimate.

9. A non-transitory computer-readable storage medium having machine instructions encoded thereon for establishing and controlling a mobile perimeter at a fixed or moving geographic location and for determining a geographical location of an unknown radio frequency (RF) emitter in a vicinity of the mobile perimeter, wherein a processor executes the machine instructions to:
receive digitized RF signal data in a form of a digitized waveforms and RF sensor location data from two or more of a plurality of RF sensors;
execute a routine to compare a frequency of a received RF signal to known unmanned aerial system (UAS) RF control signals;
perform a series of cross-correlations of the digitized RF signal data comprising comparing time differences for RF signal characteristics between waveforms from RF sensors of two or more pairs of RF sensors to produce time difference of arrival (TDOA) data for RF emissions;
use the TDOA and RF sensor location data to estimate a geographic location of the RF; and
issue an alert based on the processor executing the machine instructions to:
compare the geographic location with aircraft flight profile data for currently flying aircraft in the vicinity of the mobile perimeter, and
determine the received digitized RF signal data are from an unauthorized RF emitter.

10. The non-transitory computer-readable storage medium of claim 9, wherein the plurality of RF sensors comprises four or more RF sensors, and wherein the location estimate for the RF emitter is a 3-dimensional (3-D) location estimate.

11. The non-transitory computer-readable storage medium of claim 9, wherein the plurality of RF sensors comprises three RF sensors, and wherein the location estimate is a two-dimensional (2-D) estimate.

12. The non-transitory computer-readable storage medium of claim 11, wherein the processor uses a reference azimuth for the RF emitter, and wherein the location estimate is a 3-D estimate.

13. The non-transitory computer-readable storage medium of claim 9, wherein the processor controls a distributed clock to synchronize the cross-correlations.

14. A non-transitory computer-readable storage medium having machine instructions encoded thereon for establishing and controlling a mobile perimeter at a fixed or moving geographic location and for determining a geographic position of an unknown radio frequency (RF) emitter in a vicinity of the mobile perimeter, wherein a processor executes the machine instructions to:
receive RF signal data and RF sensor location data from two or more of a plurality of RF sensors in the vicinity of the mobile perimeter;
digitize and time stamp the RF signal data to generate a digitized waveform;
compare the digitized waveform to known unmanned arial system (UAS) control signals to identify the RF emitter as a UAS;
perform a series of cross-correlations of the RF signal data comprising comparing time differences for RF signal characteristics between waveforms from sensors of two or more pairs of the RF sensors to produce time difference of arrival (TDOA) data for RF emissions received at each sensor of a pair of sensors;
use the TDOA to estimate the geographic position of the RF emitter; and
issue a UAS alert based on the processor executing the machine instructions to:
compare the geographic location with aircraft flight profile data for currently flying aircraft in the vicinity of the mobile perimeter, and
determine the received digitized RF signal data are from an unauthorized RF emitter.

15. A non-transitory computer-readable storage medium having machine instructions encoded thereon for generating alerts by detecting a flight of an unmanned aerial system (UAS) in a restricted area and determining a location of a radio frequency (RF) emitter in communication with the UAS, wherein a processor executes the machine instructions to:
determine a geographical location estimate of an unknown RF emitter by:
using transmitted data received from two or more of a plurality of RF sensors in the restricted area, the data comprising RF sensor location data, computing a location estimate for the RF emitter and to predict the UAS is flying, comprising the processor:
receiving digitized RF signal data in a form of a digitized waveforms from one or more of the RF sensors;
performing a series of cross-correlations of the digitized RF signal data comprising comparing time differences for RF signal characteristics between waveforms from sensors of two or more pairs of sensors to produce time difference of arrival (TDOA) data for RF emissions received at each sensor of a pair of sensors; and
using TDOA data, generating the geographical location estimate of the RF emitter, and
executing a routine to compare a frequency of a received RF signal to known UAS RF control signals; and
based on the geographical location estimate, generate an alert, comprising:
comparing data transmitted by the RF sensors with aircraft flight profile data for currently flying aircraft in the restricted area; and
determining the RF signal data transmitted by the RF sensors is from an unauthorized UAS.

16. The non-transitory computer-readable storage medium of claim 15, wherein to compute the geographical location estimate, the processor executes the machine instructions to compute a time difference of arrival (TDOA)

value for each of a pair of RF sensors of the plurality of RF sensors, comprising the processor:
- receiving time of arrival (TOA) data from two or more of the plurality of RF sensors;
- computing TDOA values as a difference of TOA at each RF sensor of a pair of RF sensors; and
- computing a geographic position of a source of the RF signal using the TDOA of three or more pairs of RF sensors.

17. The non-transitory computer-readable storage medium of claim 15, wherein the processor controls each RF sensor.

18. The non-transitory computer-readable storage medium of claim 15, wherein the processor executes machine instructions to:
- produce digitized signals from received analog signals from the RF sensor; and
- time stamp the digitized signals using a common clock signal.

19. The non-transitory computer-readable storage medium of claim 15, wherein the processor executes a routine to synchronize clocks at the RF sensors.

\* \* \* \* \*